US007590381B2

(12) United States Patent
Zink et al.

(10) Patent No.: US 7,590,381 B2
(45) Date of Patent: Sep. 15, 2009

(54) SYSTEMS AND METHODS FOR PROVIDING TEXT-BASED MESSAGING SERVICES IN DIGITAL BROADCASTING SYSTEMS

(75) Inventors: Alexander Zink, Stegaurach (DE); Markus Prosch, Erlangen (DE); Olaf Korte, Igensdorf (DE); Michael Reichenbacher, Nuremberg (DE); Gerd Kilian, Erlangen (DE); Thomas Jaumann, Weisendorf (DE); Thomas Fruhwald, Nuremberg (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 564 days.

(21) Appl. No.: 11/362,604

(22) Filed: Feb. 24, 2006

(65) Prior Publication Data

US 2006/0229056 A1 Oct. 12, 2006

Related U.S. Application Data

(63) Continuation of application No. PCT/EP2004/009494, filed on Aug. 25, 2004.

(30) Foreign Application Priority Data

Aug. 26, 2003 (DE) ................................ 103 39 537

(51) Int. Cl.
*H04Q 7/20* (2006.01)
*H04H 1/00* (2006.01)
*H04M 1/00* (2006.01)

(52) U.S. Cl. .................... 455/3.01; 455/412.1; 455/566

(58) Field of Classification Search ................ 455/3.01, 455/3.02, 3.03, 3.04, 3.05, 3.06, 66.1, 412.1, 455/566, 412.2
See application file for complete search history.

(56) References Cited

U.S. PATENT DOCUMENTS 6,347,225 B1 * 2/2002 Nishiyama ............... 455/412.1

(Continued)

FOREIGN PATENT DOCUMENTS

DE 196 19 491 2/1997

(Continued)

OTHER PUBLICATIONS

"Digital Audio Broadcasting (DAB); User Application Specification;" Aug. 2000; pp. 3-23.
"Radio Broadcasting Sytems; Digital Audio Broadcasting (DAB) to Mobile, Portable and Fixed Receivers;" Sep. 2000; pp. 38-41, 53, & 132-133.
European Search Report dated Sep. 28, 2007.

*Primary Examiner*—Tilahun Gesesse
(74) *Attorney, Agent, or Firm*—Thomas, Kayden, Horstemeyer & Risley

(57) ABSTRACT

It is a finding of the present invention that a user of a broadcast receiver gets text information significantly more quickly if a reference to another text information object in the broadcasting signal is contained in a text information object included in the broadcasting signal, which is currently displayed on the display of the broadcast receiver, and the user is enabled to cause the text information to be displayed to be changed from the text information of the current text information object to the text information of the text information object to which the current text information object refers by simple operation of a user selection means. Here, the additional effort is very limited since in today's broadcast receivers there mostly is an "unoccupied" key, which only has an assigned function and thus is occupied in special situations of use of the broadcast receiver, and may be used as user selection means, as far as that goes. Due to the strong limitation of the available bandwidths of common broadcasting systems for data services, codings as efficient as possible are used in the generation of the text information objects to be transmitted.

34 Claims, 10 Drawing Sheets

U.S. PATENT DOCUMENTS

| | | | | |
|---|---|---|---|---|
| 7,180,917 | B1 * | 2/2007 | Marko et al. | 370/535 |
| 7,228,100 | B2 * | 6/2007 | Toporski et al. | 455/3.06 |
| 7,401,232 | B2 * | 7/2008 | Ono et al. | 713/193 |
| 7,415,243 | B2 * | 8/2008 | Yuhara et al. | 455/12.1 |
| 2001/0052022 | A1 | 12/2001 | Schaefer et al. | |
| 2003/0110272 | A1 * | 6/2003 | du Castel et al. | 709/229 |

FOREIGN PATENT DOCUMENTS

| | | |
|---|---|---|
| DE | 196 19 491 C2 | 2/1997 |
| DE | 101 50 596 | 4/2003 |
| DE | 101 50 596 A1 | 4/2003 |
| EP | 0762680 | 2/1997 |
| EP | 0 881 792 | 12/1998 |
| EP | 0 967 747 | 12/1999 |
| EP | 1146673 | 10/2001 |
| EP | 1303065 | 4/2003 |
| WO | WO 97/13336 | 4/1997 |
| WO | WO 97/13337 | 4/1997 |
| WO | WO 02/082808 | 10/2002 |

* cited by examiner

SYSTEMS AND METHODS FOR PROVIDING TEXT-BASED MESSAGING SERVICES IN DIGITAL BROADCASTING SYSTEMS

CROSS-REFERENCE TO RELATED APPLICATION

This application is a continuation of co-pending International Application No. PCT/EP2004/009494, filed Aug. 25, 2004, which designated the United States and was not published in English and is incorporated herein by reference in its entirety.

BACKGROUND OF THE INVENTION

1. Field of the Invention

The present invention relates to radios and, in particular, to those having a display so as to be able to display text information.

2. Description of the Related Art

Text-based message services for digital broadcasting systems in which a user of a radio can read text messages on a display of the radio already exist. Here, along with the audio information for the radio, further information, namely text information, is broadcast in the broadcasting signal. An audio broadcasting standard enabling this transmission of audio information and text information together in a transmission channel or broadcasting signal is the DAB (digital audio broadcasting) standard, for example.

Text-based message systems now already take advantage of this possibility of digital broadcasting to broadcast text messages to terminals. For example, broadcasting stations send text information, which can be displayed on the display of the broadcast receiver of the user, such as the name of the broadcasting program or the latest news or the like, along with the actual broadcasting program, i.e. the audio information. The person responsible for the program decided on the kind and order of the information. Previous text-based message services permitted a user to take only limited influence on the selection of the text messages displayed on his or her display, such as by changing the program.

SUMMARY OF THE INVENTION

Therefore, it is an object of the present invention to provide a text information service scheme offering a user a more effective possibility to get desired text information via the broadcast by means of a radio.

In accordance with a first aspect, the present invention provides a broadcast receiver, having a receiver for receiving a broadcasting signal including text information objects in which text information is contained, wherein the text information objects are arranged successively in time in the broadcasting signal, and each text information object has an object identification number; a display for displaying text information to be displayed; a user selector operable by a user; a cache memory for temporarily storing text information objects already received; a controller formed to change the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and a cache displacer for comparison of the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is formed to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored In accordance with a second aspect, the present invention provides a method of controlling a broadcast receiver having a receiver for receiving a broadcasting signal including text information objects in which text information is contained, a display for displaying text information to be displayed, a user selector operable by a user, and a cache memory for temporarily storing text information objects already received, wherein the text information objects in the broadcasting signal are successively arranged in time, and each text information object has an object identification number, with the steps of: changing the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and comparing the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is formed to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored.

In accordance with a third aspect, the present invention provides a computer program with program code for performing, when the computer program is executed on a computer, the method of controlling a broadcast receiver having a receiver for receiving a broadcasting signal including text information objects in which text information is contained, a display for displaying text information to be displayed, a user selector operable by a user, and a cache memory for temporarily storing text information objects already received, wherein the text information objects in the broadcasting signal are successively arranged in time, and each text information object has an object identification number, with the steps of: changing the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and comparing the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is formed to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored.

In accordance with a fourth aspect, the present invention provides a broadcast receiver, having a receiver for receiving a broadcasting signal including text information objects in which text information is contained, wherein the text information objects are arranged successively in time in the broadcasting signal, and each text information object has an object identification number; a display for displaying text information to be displayed; a user selector operable by a user; a controller formed to change the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; wherein each text information object has a static flag, wherein the broadcast receiver further has: a favorite caller operable by the user; a user adder operable by the user; a favorite memory for storing an object identification number; wherein the controller is formed to change the text information to be displayed from the currently displayed text information to text information of a text information object having the same object identification number as the one stored in the favorite memory depending on an operation of the favorite caller by the user, and wherein the controller is formed to examine the static flag of the currently displayed text information object depending on the operation of the favorite adder by the user, and to ignore the operation in case the static flag is not set, and to enter the object identification number of the currently displayed text information object into the favorite memory in case the static flag is set.

In accordance with a fifth aspect, the present invention provides a method of controlling a broadcast receiver having a receiver for receiving a broadcasting signal including text information objects in which text information is contained, a display for displaying text information to be displayed, and a user selector operable by a user, wherein the text information objects in the broadcasting signal are successively arranged in time, and each text information object has an object identification number, wherein the broadcast receiver further has a favorite caller operable by the user, a user adder operable by the user, and a favorite memory for storage of an object identification number, the method further having the steps of: depending on an operation of the user selector by the user, changing the text information to be displayed from currently displayed text information of a currently displayed text information object to text information of a text information object to which the current text information object refers, wherein the object identification number of the current text information object differs from the object identification number of the text information object to which the same refers; depending on an operation of the favorite caller by the user, changing the text information to be displayed from the currently displayed text information to text information of a text information object having the same object identification number as the one stored in the favorite memory; depending on the operation of the favorite adder by the user, examining the static flag of the currently displayed text information object; in case the static flag is not set, ignoring the operation; and in case the static flag is set, entering the object identification number of the currently displayed text information object into the favorite memory.

In accordance with a sixth aspect, the present invention provides a computer program with program code for performing, when the computer program is executed on a computer, the method of controlling a broadcast receiver having a receiver for receiving a broadcasting signal including text information objects in which text information is contained, a display for displaying text information to be displayed, and a user selector operable by a user, wherein the text information objects in the broadcasting signal are successively arranged in time, and each text information object has an object identification number, wherein the broadcast receiver further has a favorite caller operable by the user, a user adder operable by the user, and a favorite memory for storage of an object identification number, the method further having the steps of: depending on an operation of the user selector by the user, changing the text information to be displayed from currently displayed text information of a currently displayed text information object to text information of a text information object to which the current text information object refers, wherein the object identification number of the current text information object differs from the object identification number of the text information object to which the same refers; depending on an operation of the favorite caller by the user, changing the text information to be displayed from the currently displayed text information to text information of a text information object having the same object identification number as the one stored in the favorite memory; depending on the operation of the favorite adder by the user, examining the static flag of the currently displayed text information object; in case the static flag is not set, ignoring the operation; and in case the static flag is set, entering the object identification number of the currently displayed text information object into the favorite memory.

It is a finding of the present invention that a user of a broadcast receiver gets text information significantly quicker if a reference to another text information object in the broadcasting signal is contained in a text information object included in the broadcasting signal, which is currently displayed on the display of the broadcast receiver, and the user is enabled to cause the text information to be displayed to be changed from the text information of the current text information object to the text information of the text information object to which the current text information object refers by simple operation of a user selection means. Here, the overhead is very limited since in today's broadcast receivers there mostly is an “unoccupied” key, which only has an assigned function and thus is occupied in special situations of use of the broadcast receiver, and may be used as user selection means, as far as that goes.

According to a particular embodiment of the present invention, the text information objects in the broadcasting signal are broadcast successively along with other information in the broadcasting signal, such as the audio information or other information, from a broadcast transmitter, wherein each text information object comprises an object ID. If a text information object refers to another text information object, their object IDs differ. Introducing the object IDs enables dividing the text information objects in the broadcasting signal into groups in terms of content and repeatedly transferring them cyclically in receiver-recognizable manner and updating them at the same time. Without having to analyze the content of the text information objects, i.e. the text information, in terms of content, a broadcast receiver may thus recognize whether a certain text information object just received, though differing from the currently displayed one, concerns the same subject as a previously received one and thus represents an update, or the currently received text information object concerns a completely different subject in terms of content. An update may be made in simple manner by comparing the object ID of a text information object in the broadcasting signal immediately or not immediately following the currently displayed text information object with the object ID of the currently displayed one. Depending on whether the comparison yields the identity in the object IDs, the update will be made or not.

According to an embodiment of the present invention, the update can be made simpler for the broadcast receivers by the text information objects comprising, besides the object ID, also a revision index giving details about which version of the text information associated with this object ID this text information object concerns. Consequently, a radio receiver is not forced to blindly make an update always when a text information object the object ID of which matches the object ID of the currently displayed text information object is again broadcast in the broadcasting signal. Rather, the update is also made dependent on whether the revision index has changed. As a result, image build-up and other rendering mechanisms are omitted if the new text information object with the same object ID cannot differ from the already displayed one at all in terms of content, since it concerns the same version of the text information on this object ID. The overhead by the load of the transmission channel by the revision index in each text information object is comparably small.

Moreover, the update may further be made more user-friendly if it is differentiated between the individual text information objects. According to an embodiment of the present invention, there are menu objects, list objects, and pure text objects. Each text information object is associated with one of these types by an object descriptor of an object type ID. In the case that it is menu or list objects, the broadcast receiver performs the update immediately, i.e. without user interaction, whereas otherwise the update is made dependent on whether the user approves of the update, so as not to be suddenly interrupted when reading a contiguous, longer text due to a possibly only minor update.

According to a further embodiment, in the update, it is also provided that, in case the amount of text information of the new text information object is greater than a displayable quantity, the display shows an excerpt of the text information of this new text information object at least partially overlapping with an excerpt the display showed of the old text information object prior to the update. In list and menu objects, in particular, this yields the advantage that the user does not have to reorient in the list or menu after a completed update, and that he or she nevertheless gets to know about the update when scrolling further.

If the broadcast receiver or radio comprises a cache memory for temporarily storing text information objects already received, it is possible for it, at a change of the text information to be displayed from text information of the current text information object to text information of the text information object with another object ID to which the current text information object refers, to at first look up in the cache memory whether a text information object with this object ID is already present in the cache memory. Thus, the user gets to new text information of the new text information object more quickly and does not have to wait for the time duration until a text information object with the desired object ID to which the current text information object refers is again broadcast in the broadcasting signal.

For the user to know instantly which menu options refer to object IDs for which a text information object is stored in the cache memory when reviewing the menu or scrolling through the same, a cache hit identifier may be provided, which at first looks up text information objects for all object IDs associated with the menu options of the menu object in the cache memory, and then causes the menu options for which text information objects are present in the cache memory to be visibly distinguishable for the user from those for which text information objects are not yet present in the cache memory. For a user, this speeds up zapping through the menus, i.e. the nodes of the object tree, according to which the text information objects are arranged.

According to a further embodiment of the present invention, a broadcast receiver supports a favorite functionality. In a favorite memory, one or more object IDs of text information objects concerning subjects the user is repeatedly interested in, for example every morning on the way to work, and he or she may fetch by operating a favorite fetching means, are stored for this. A text information object includes a static flag, for example, in order to prevent the user from adding, to the favorite, object IDs not associated with a text information object with this subject in the long run, such as a one-time news item, but afterwards again assigned to a text information object with another subject in terms of content. The add-to-favorite functionality of the broadcast receiver is only activated when the static flag is set, otherwise it is not, whereby pointless adding of randomly assigned object IDs is avoided.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
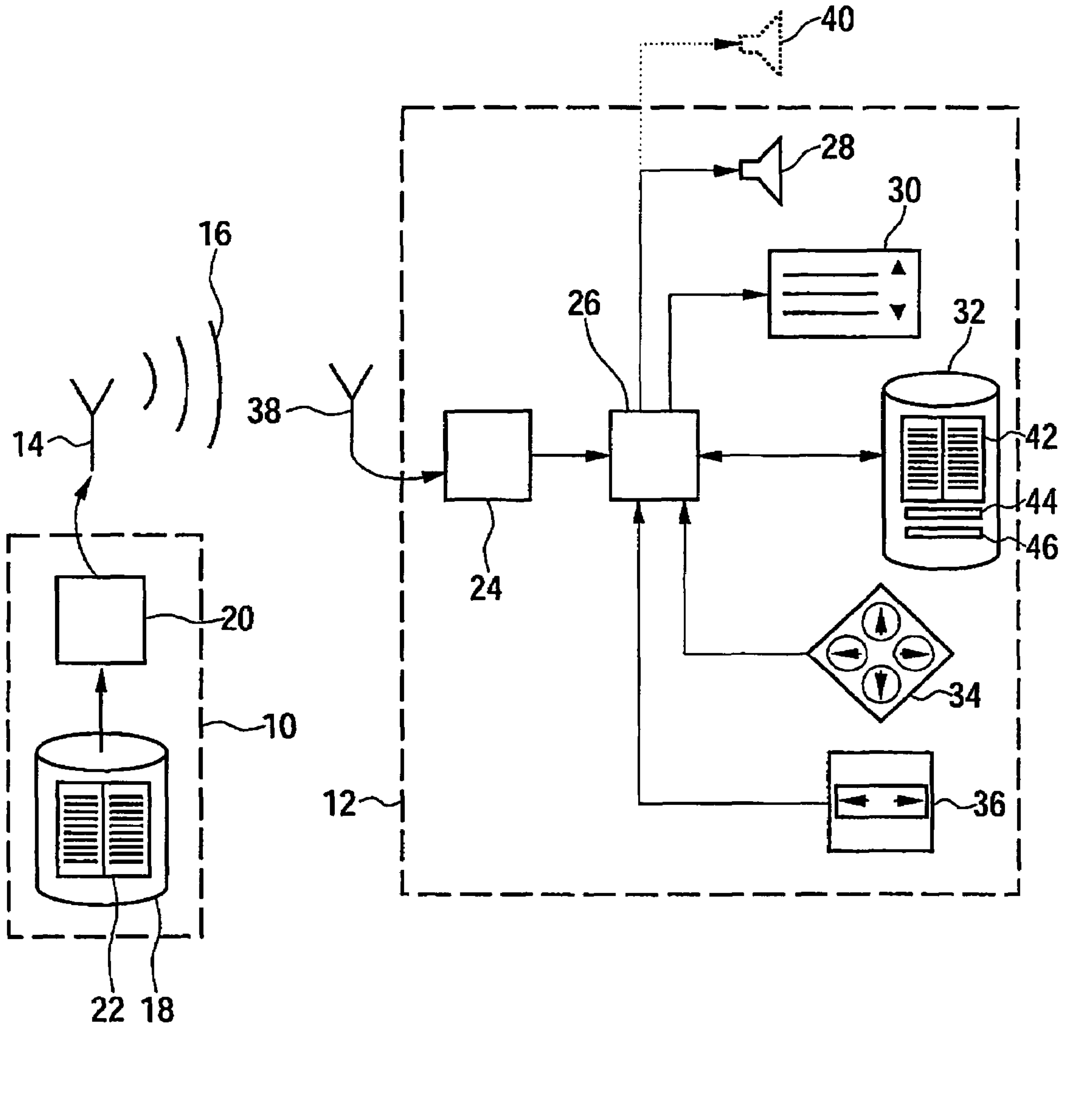
FIG. 1 is an overview block circuit diagram with transmitter and receiver for illustrating a text information broadcasting service according to an embodiment of the present invention.

Subsequently, the present invention will be described with reference to the figures against the background of a text information broadcasting service, as it is shown in FIG. 1 in construction. Radios according to the present invention could, however, also find application in the scope of other text information broadcasting systems. For elements present likewise in different figures, the same reference numerals have been used for those, wherein repeated description of the elements has been avoided.

The text information broadcasting service according to FIG. 1, which will also sometimes be referred as "NewsService Journaline" in the following, is illustrated in FIG. 1 at a pair of a broadcast transmitter 10 and a broadcast receiver 12. The broadcast transmitter 10 is a stationary, central broadcasting station broadcasting broadcasting signals 16 to a multiplicity of broadcast receivers, such as the broadcast receiver 12, via an antenna 14, such as a transmitter mast. Apart from audio information, which may concern different broadcasting programs, the broadcasting signal 16 includes text information intended for the broadcast receivers or terminals 12 and their users within the scope of the text message broadcasting service. The broadcasting signal 16 corresponds to the DAB standard, for example.

Apart from other components intended for the audio transmission or for the transmission of the audio information and not shown here for clarity reasons, the broadcast transmitter 10 includes a memory 18 and an integration means 20. The memory 18 contains a list 22 of text information objects. As will be described in still greater detail later, each text information object includes at least one object identification number or object ID as well as the actual text content, i.e. the text information. Apart from that, text information objects, depending on their type, also include further information, as it will also be described in greater detail in the following. The text information objects in the list 22 are serviced and updated by a service operator. It makes the selection of topics concerning the objects, the structure in which the objects are arranged, and the time duration in which the same are repeatedly broadcast cyclically.

The integration means 20 is connected to the memory 18 so as to read out the text information objects from the memory 18 and integrate them into the broadcasting signal in order to broadcast it via the antenna 14 as the broadcasting signal 16. The read-out or broadcast by the integration means 20 takes place cyclically for each text information object, so that all text information objects altogether are successively broadcast in the broadcasting signal 16 with different cycle repetition times, as it will be described in greater detail later with reference to FIG. 5.

A broadcast receiver 12 according to the present embodiment includes a reception means 24, a control means 26, a loudspeaker 28, a display 30, a memory 32, a first panel 34 and a second panel 36. The reception means 24 is connected to an antenna 38 at a data input so as to receive the broadcasting signal 16 via the same 38. The reception means 24 is suitably designed to extract the audio information and the text information from the broadcasting signal 16 and forward them to the control means 26 via its data output.

The control means 26, such as a processor or the like, at first forwards the audio information to the loudspeaker 28. Here, a selection among an offer of various audio contents or broadcasting programs will already have been made. The forwarding of selected audio signals may either take place via an internal line to an integrated loudspeaker 28, as it is illustrated with solid lines in FIG. 1, or via a loudspeaker terminal or by output of suitable audio signals to an external loudspeaker 40 arranged external to the broadcast receiver 12, as it is shown with dotted lines in FIG. 1.

Via the panel 36, which for example only includes a toggle switch with two toggle positions, the user of the broadcast receiver 12 may for example change from one broadcasting program to the other. To this end, the panel 36 is connected to the control means 26, which is in turn formed to change the current program, and thus the audio signals to the loudspeakers 28 or 40, depending on a respective toggle position present.

The control means 26 obtains further control signals from the panel 34. The panel 34, for example, consists of four buttons, one with an arrow down, one with an arrow up, one with an arrow left, and another with an arrow right, or of two toggle switches arranged perpendicularly to each other, or a diamond-shaped toggle switch, wherein there are, however, also other possibilities for the panel 34. Instead of a panel with buttons, a voice input could be provided, for example. The panel 34 is provided so that the user may supply control signals, with which he or she can influence, which text information the control means 26 forwards to the display 30 as the text information to be displayed, in a manner, as it will be discussed in greater detail in the following, to the control means 26 via the panel 34. The text information the control means 26 forwards to the display 30 is extracted by the same from the text information objects contained in the broadcasting signal 16 and extracted from the broadcasting signal by the reception means 24. The text information display functionality is completely separated from the reproduction of the audio information, so that the sound reproduction or the program currently reproduced via the loudspeaker 28 or 40 is not interrupted on actuation of the panel 34.

The broadcast receiver 12 of FIG. 1 further includes, in the memory 32 in the following also referred to as cache memory and being a RAM, for example, a list of already received text information objects 42, an object path list 44 of object IDs the content and meaning of which will be discussed in greater detail in the following, and a list or array of object IDs, referred to as favorite list 46 the meaning of which will also be specified in greater detail in the following.

By the “NewsService Journaline”, the user of the radio or broadcast receiver 12 may easily and immediately access information according to his or her current type of interest. The information is present in simple text form. The text information is contained in the text information objects. There are various text information objects, which can be distinguished by their type. On the one hand, there are menu objects, text objects, and list objects. Before going into the construction of the individual object types in greater detail, their hierarchic structure is to be illustrated briefly with reference to FIG. 2.

Figure 2:
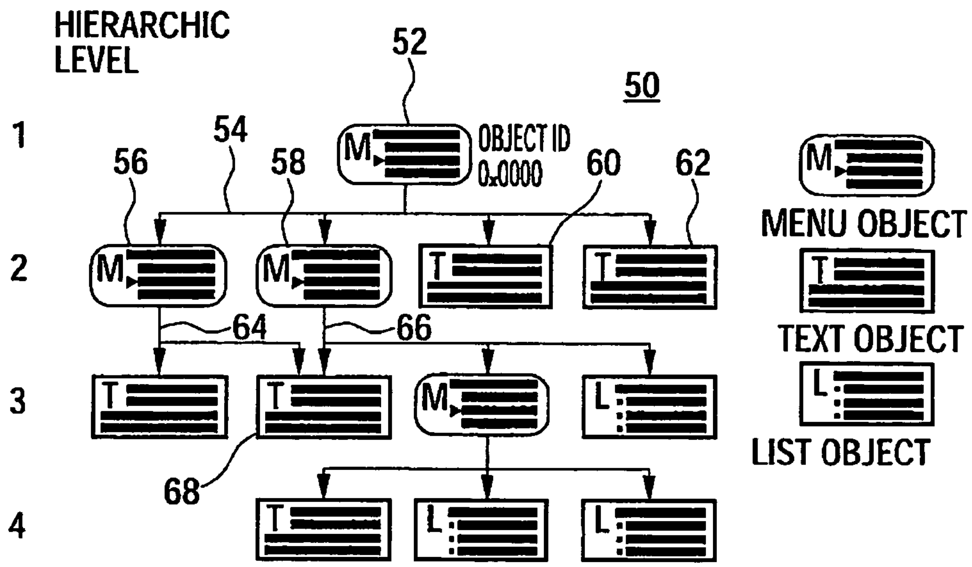
FIG. 2 is an exemplary tree structure in which the text information objects of the service of FIG. 1 are arranged.

FIG. 2 illustrates how the text information objects are arranged in a tree structure according to the present embodiment. FIG. 2 shows an exemplary example of an object tree 50 of text information objects. The text information objects are displayed in FIG. 2 with angular rectangles or rounded rectangles. Each text information object is labeled “M”, “T”, and “L” for menu, text, and list object, respectively. As already mentioned, an object ID is associated with text information object. Only as an example, it is assumed that the fixed object ID 0 is associated with the text information object at the root of the object tree 50, i.e. 0x0000. This main menu object, indicated at 52, is in the first hierarchic level of the object tree 50 and is at first forwarded to the display 30 for display from the control means 26, once it has been broadcast via the broadcasting signal 16 after switching on the radio 12. Consequently, the main menu object 52 is shown at the beginning, when the user switches on the radio or the “NewsService Journaline” functionality of the radio 12 for the first time, without requesting a specific object ID.

In the embodiment of FIG. 2, the text information object at the root of the object tree 50 is a menu object. As it will be discussed in greater detail still in the following, each menu object includes in its text information several menu options or menu points, with each of which a reference to a text information object of a next higher hierarchic level in form of an object ID is associated. In the present, exemplary example, the menu object 52 includes four menu options, and thus four references to other text information objects, as it is indicated with arrows 54. In particular, in the present example, the menu object 52 refers to two further menu objects 56 and 58 as well as two text objects 60 and 62, which all four form the text information objects of the second hierarchic level. While the menu objects 56 and 58 of the second hierarchic level themselves again comprise references to further text information objects, indicated by arrows 64 and 66, text objects, and thus also the text objects 60 and 62, do not include any reference to another text information object. The text objects “T” thus form the leaves of the object tree 50. The same applies for list objects “L”.

As it is illustrated in FIG. 2, the exemplary object tree 50 of FIG. 2 thus forms four hierarchic levels, but with any other number also being possible. Furthermore, it is possible that two menu objects (of maybe different hierarchic levels) refer to the same text information object, as it is also shown in FIG. 2 at arrows 64 and 66 and the text information object 68 in the third hierarchic level.

The number of hierarchic levels of the tree structure may be limited to a certain value, such as 20, so that the memory space for the storage of the data path 42 may be suitably dimensioned on the reception side at the broadcast receivers 12.

From the description of FIG. 2, it becomes obvious that each text information object, in the following sometimes also simply referred to as object, has to be referenced by at least one menu object, or that at least one menu object has to comprise a reference to the same. Only for the object 52 at the root of the object tree 50, there has to be no text information object referring to the same. Of course, this would be possible, however.

The text information objects thus are structured as in FIG. 2. All these text information objects in the object tree 50 are stored in the list 22 in the memory 18 of the broadcast transmitter 10. For any reason, if the broadcast transmitter 10 was not able to offer the “NewsService Journaline” service, the object at the root of the object tree 50 may also be a text object, so that the object tree 50 comprises only one hierarchic level, wherein the text information in this text object for example indicates the temporary failure of the service.

Figure 3:
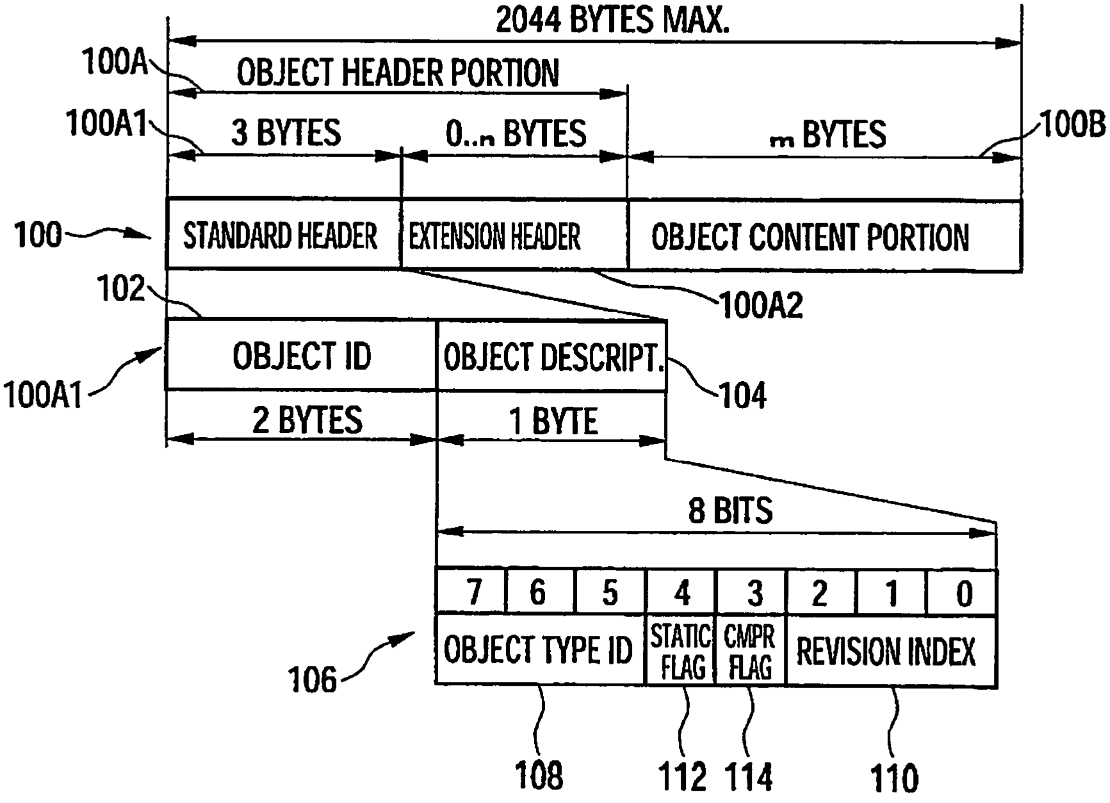
FIG. 3 is a schematic drawing for illustrating the construction of the text information objects according to the service of FIG. 1 according to an embodiment of the present invention.

FIG. 3 shows an embodiment for the construction of text information objects according to an embodiment of the present invention. According to FIG. 3, a text information object 100 is divided into an object header portion **100*a* and an object content portion 100*b* and is a maximum of 2044 bytes long. The maximum length is not mandatory. Of course, it would also be possible to permit unlimited length. But it enables the storage of the object 100** to take place both on the reception side and on the transmission side in simple manner in arrays in which the objects are arranged with an offset of 2044 bytes or a multiple thereof to each other and thus are easy to handle.

The object header portion **100*a* in turn is, for example, itself divided into a 3-byte-long standard header 100*a*1 and an extension header 100*a*2, wherein it is assumed that the latter would have a length of n bytes, with n being an integer greater than or equal to zero. The object content portion 100*b*** is m bytes long, with m being an integer greater than zero.

The standard header **100*a*1 is again for example divided into a 2-bytes or 16-bits-long object ID 102, which may be 0x0000 in the main object 52 (FIG. 2), as mentioned, and an object descriptor 104 occupying the eight less significant bits of the standard header 100. The number of 16 bits of the object ID limits the number of IDs that can be given away to $2^{16}$, i.e. about $10^6$. The bits of the object descriptor 104 have varied meaning. As it is hinted at with 106, the three MSBs (most significant bits) of the object descriptor 104 form an object type ID 108, the three LSBs (least significant bits) a revision index 110, and the two bits in between a static flag 112 and a compression flag 114**.

The object ID 108 indicates the object type of the text information object 100 by its value, as it is shown in the subsequent table.

| Object type ID value | Object type |
|---|---|
| 0x1 | Menu object |
| 0x2 | Text object |
| 0x3 | Title-only object |
| 0x4 | List object |

Of course, the list may at any time be supplemented by new object types, which would have to be ignored by previous receivers.

As it will still be discussed in the following, the static flag means that, if it is set, it is possible for the user to add the object ID 102 to the favorite list 46. The static flag is set or not set by the text information broadcasting service operator, depending on whether the object ID is assigned only randomly and temporarily, i.e. only displays information equal in terms of content in temporarily limited manner, in which case adding to the favorite would not make sense, or the assignment of the object ID is permanent, and thus favorite adding would make sense, as it will still be discussed in greater detail in the following.

The compression flag 114 indicates whether the object content portion 100*b* is compressed in predetermined manner or not. The revision index is set by the service operator, in order to indicate, in the text information objects with the same object ID transmitted in series in cyclically repeated manner, the version of the text information or the subject to which these text information objects refer. With each update, the revision index 110 is incremented on the transmission side. For example, if the text information of a certain object ID concern the soccer match standing of a soccer match currently taking place, the text information "0:0" indicating the standing would be transmitted in the first text information objects with this object ID along with the revision index $000_b$ (b for binary), whereas after a goal the text information in the memory 18 would be changed to "0:1" and at the same time the revision index would be changed from $000_b$ to $001_b$, so that subsequently transmitted text information objects with this object ID would have the text information "0:1" and the revision index $001_b$. Consequently, the revision index enables, as it will still be discussed in greater detail in the following, updates to be performed on the reception side depending on whether the revision index has changed from a text information object already received to a newly received text information object, without having to analyze in terms of content.

On the transmission side, the object ID is linked with text information then contained in the object content portion 100*b*, as it will still be explained in the following. As already mentioned, there are object IDs that are assigned randomly and only temporarily and in which the static flag 112 is not set, and such ones in which the object IDs are fixedly linked to a kind of text information (for example the current weather report of a city), which is updated, if necessary, wherein the revision index 110 is then incremented.

The extension header 100*a*2 represents an extension option for the message service. If it is displayed in the data application signaling information of the broadcasting system, i.e. the control information in the broadcasting signal along with the audio information and the text information, that the extension header 100*a*2 contains additional header information, a receiver not capable of working with the extension header may easily ignore this portion. Since the display takes place in the use of the extension header and the usual data application signaling information of the broadcasting system, the length of the extension header 100*a*2 is the same for all objects of the "NewsService Journaline".

As already mentioned, the actual text content or the text information in the text information objects is contained in the object content portion 100*b*. The text information is coded in UTF (Unicode Transformation Format) 8-bit coding, for example.

Before illustrating in greater detail the coding of the text information and the further information in the object content portion 100*b* with reference to FIG. 4, at first each object type will be described in greater detail in the following with reference to FIGS. 6*a* to 6*d*. FIGS. 6*a* to 6*d* each show an example for a screen display, as it results on the display 30 depending on the object type. It is to be mentioned that the examples assume a display capable of representing several lines on a screen, but that the service may of course also be realized on existing car radio displays, which mostly can display one line with 16 characters only.

FIG. 6*a* shows the screen construction, as it results on the display 30 at display of the text information of a text object, i.e. with object type ID=0x2. As can be seen, a piece of text information or a text only message of a text object is divided into a title 150 and the actual text 152, the so-called text body. For illustration to the user, the title 150 and the subsequent actual text portion 152 are displayed or rendered on the screen of the display 30 with automatic line folding. The user may scroll through the text vertically, for example by actuation of a vertically arranged toggle switch or the like on the panel 34. The title 150 is attached to the text portion 152, so that it may be shifted out of the displayed portion of the display 30 along with the remaining text 152, if necessary. Any font may be used for the display.

More specifically, it will be the normal case that the amount of text information of a text object is greater than a displayable amount or quantity, so that only part of the text information can be displayed on the screen of the display 30. This displayable portion is shifted across title 150 and text 152 by actuation of corresponding keys on the panel 34. This possibility is displayed to the user by corresponding arrows on the right edge of the screen of the display 30, as it can be seen in FIG. 6*a* at 154 and 156. Presently, the displayable portion lies at the beginning of the entire text message. Further upward scrolling does not make any sense. This is indicated by corresponding colored highlighting of the arrow 154 pointing upward, for example. Corresponding highlighting is performed with the arrow 156 if the displayable area or portion lies at the end of the message, and scrolling downward is therefore not possible anymore.

FIG. 6*b* shows a title-only message or a title-only object (object type ID=0x3). Title-only messages include only one title 150 displayed on the screen of the display 30. A text portion 152 or body text is not provided. For the illustration to the user, the title text 150 is displayed on the screen of the display 30 with automatic line folding, for example. If applicable, the user may scroll through the text. Presently, however, the title can be displayed completely on the screen of the display 30, so that by the arrows 154 and 156 missing, it is indicated to the user that the title 150 has been displayed completely and there is no scroll possibility. The illustration of a pure title message may for example always take place in centered manner in both line and vertical direction. As font, again any one may be used equally well.

Figure 6:
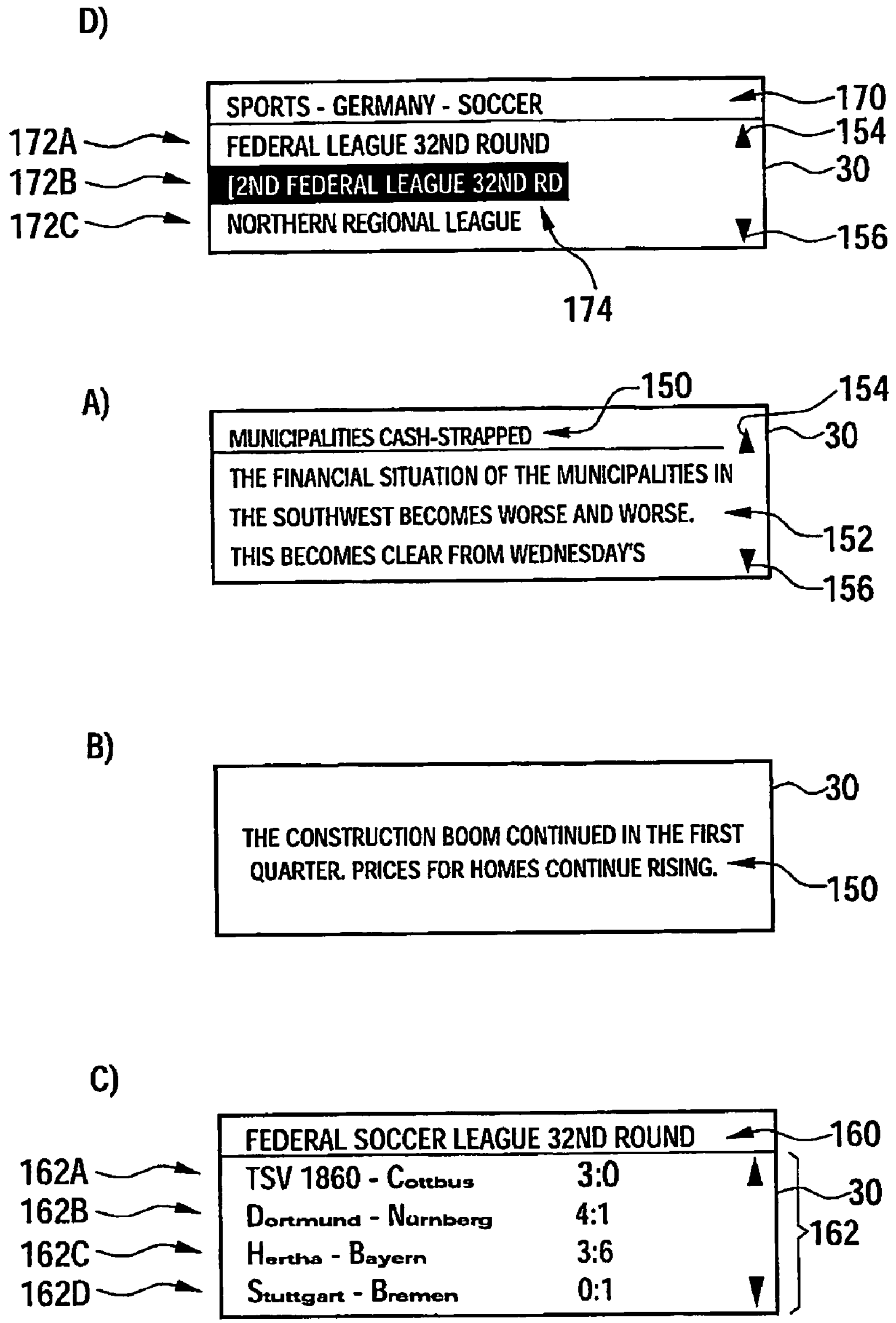
FIG. 6*a-d* are exemplary screen displays on the display of the broadcast receiver of FIG. 1.

FIG. 6*c* shows a list message or the text information of a list object (object type ID=0x4). A list message contains a title 160 and a list of text lines 162*a* to 162*d*. For the illustration to the user, the title should always be seen on the screen of the display 30, different from the text messages shown in FIG. 6*a*, while the user is scrolling through the lines 162*a* to 162*d* of information in the body portion 162. It may be advantageous to use a font comprising uniform character repetition spacing in line direction for the illustration of list objects, in order to enable two-column tables by providing spaces (space characters), like in the example of FIG. 6. If the title 160 of any line 162*a* to 162*d* exceeds a line length of the screen of the display 30, this list point of this list line is cut off at the end of the line, for example.

FIG. 6*a* shows menu or the text information of a menu object (object type ID=0x1). A menu contains a title 170 and a list of menu options 172*a*, 172*b*, and 172*c*. With each menu option, there is associated a reference to another text information object, namely in form of an object ID. As with the list object of FIG. 6*c*, the user may scroll through the menu options. In this, always one of the menu options is highlighted on the screen of the display 30, in this case the menu option 172*b*. If the user indicates, by pressing a suitable key on the panel 34, such as the right key, that he or she wants to go to the text information object to which the reference of the menu options just highlighted refers, and the content of which is described as well as possible by the text in the highlighted line of the menu, such as by the menu option text "Second League $32^{nd}$ Round" in the present case, the text information of this text information object is displayed on the display next, as it will be described in the following, whereby the current object or the current text information on the screen of the display 30 is replaced by the new one.

More specifically, a menu option thus consists of a reference to another text information object and a label representing a line on the screen of the display 30 and designating or describing the content of the referenced text information object. If the title of a label exceeds the length of a line of the screen of the display 30, the corresponding content could be cut off. Apart from the corresponding scroll arrows 156, 154, menu options that cannot be displayed immediately because they are not yet in the cache memory 32 are highlighted by square brackets 174 on the screen of the display 30 in the case of a menu object, as will still be discussed in greater detail in the following.

Having previously described examples for text information of text information objects of different object type with reference to FIG. 6, the coding of this text information in the object content portion 100*b* (FIG. 3) will be exemplarily described in the following with reference to FIGS. 4*a*-4*e*. Owing to the strong limitation of the available bandwidths of common broadcasting systems for data services, codings as efficient as possible are used in the generation of the text information objects to be transmitted.

The object content portion is normally divided into a title and a body portion. Only with title-only objects is the body portion missing in the object content portion. The title and body portions of each object are structured by NML (News-Service Markup Language) codes indicating the beginning and the end of a certain information block within the object content portion, such as of the title and body portions.

Within a certain information block, such as the title or body portion, escape sequences may be provided to introduce text formatting information, such as text highlighting, forced line folding, etc., as well as additional functionalities, such as information areas that may simply be ignored by receivers not capable of handling or supporting the additional functionality.

Both NML codes and escape sequences are one-byte codes from the range of 0x00 to 0x1F, so-called UTF-8 control codes. Specifically, the NML codes include the range of 0x00 to 0x0F and the escape sequences a range of 0x10 to 0x1F.

In the following, with reference to the examples of FIGS. 4*a* to 4*e*, examples for text information objects (FIGS. 4*a* to 4*c*) or information blocks in the object content portion (FIGS. 4*d* and 4*e*) will be described.

At first, the NML code will be explained in greater detail. Each object portion or object block in the object content portion is started with an NML code and terminated by either the NML code "end", the occurrence of a further NML code, or the end of the object content portion.

The NML codes are exemplarily defined in the following manner:

Let 0x00 be the NML code for "end". It is used to terminate a portion or block within the object content portion, without beginning a further portion or further block. It is applicable to each object type.

Let 0x01 be the NML code for "title", indicating the beginning of the title portion or title block by its occurrence in the object content portion 100*b* on the reception side. Exactly one title block has to be present per object for all previously defined object kinds, i.e. the NML code 0x01 has to occur at least once in the portion 100*b*. Moreover, the title block has to be the first block in the object content portion 100*b*. The NML code 0x01 is also applicable with all object types.

Let 0x02 be the NML code for a menu option block beginning. This code thus represents the beginning of each menu option in this menu object. Consequently, this code is only provided for menu objects. Upon the occurrence of the NML code 0x02, the receiver or a decoder (not shown) provided in the control means 26 at first awaits the target address or the reference or the object ID of the text information object to which it is referred in the subsequent bytes, and then the text of the menu option to be displayed and describing the content of the referenced object. The code 0x02 occurs once in the object content portion per menu option of a menu object. More particularly, the decoder in the control means 26, on the reception side, waits for two bytes to follow the code 0x02 indicating the object ID of the referenced object, i.e. the object to be displayed, if the user selects this menu option, and thereupon still for n bytes displaying the menu option description to be displayed, which is to be displayed to the user in a line of the menu and is to enable him or her the selection among all menu options, as it were.

For example, FIG. 4*a* shows a text information object for the menu object of FIG. 6*a* with the NML codes 0x00 to 0x02 for illustration. As already described with reference to FIG. 3, the object 100 starts with an object header 10*a*, which is presently n bytes long, for example. Then, the object content portion 100*b* follows. The first byte of the object content portion 100*b* is 0x01, i.e. the NML code indicating the beginning of the title block, the text content of which immediately follows the NML code 0x01 at the byte position 0+1 and extending from byte 0+2 to byte k. In this portion 200, the title of the menu of FIG. 6*d*, namely "Sports-Germany-Soccer", is stored in a manner, as it will still be specified in greater detail in the following. The reception-side decoder knows when the title 200 is finished, since the text information of the title is only coded with one-byte or multi-byte UTF-8 codewords, which are not NML codes or escape sequences, as mentioned previously. Consequently, as soon as the reception-side decoder encounters the NML code 0x02 at the byte k+1, as it is shown, it knows that this is the beginning of a next block, namely the first menu option block. The following two bytes k+2 and k+3 display the next text information object to be displayed by object ID 0xAABB, in case that this menu point is selected. Then, at 202, the text coding for the first menu option of the menu of FIG. 6*d*, namely "Federal League $32^{th}$ Round", follows within the bits k+4 to p. Hereupon, again an NML code 0x02 for indicating the beginning of a menu option block follows at byte p+1. For illustration, the menu option blocks are once again indicated at the reference numerals 204*a*, 204*b*, and 204*c*. At the end of the text information object 100, the NML code 0x00 occurs at byte t+1. It indicates the end of in this case the entire text information object 100. This NML code 0x00 may be missing if the length of the entire text information object is contained in the extension header, for example, so that the end of the entire object can be determined on the reception side by corresponding syntactic analysis or parsing.

Furthermore, let 0x03 be the NML code to indicate the beginning of a body block in the object content portion. Thus, this contains the text of the text body displayed as the actual text in the text object, i.e. as 152 in FIG. 6*a*, for example. In each object content portion, only one body block is possible, and consequently only the occurrence of 0x03 only once. The code only occurs in text objects. The NML code 0x03 is missing in the object content portion in title-only objects, since these do not comprise a text body, but only a title. A coding example for a title information object is exemplarily shown in FIG. 4*b* for the text object of FIG. 6*a*. The body block is to be seen at 206. It consists of the NML code 0x03 followed by the UTF-8 coding for the body text 152, namely "The financial situation of the municipalities . . . ".

Let the NML code 0x04 indicate the beginning of a list point block in the object content portion. This code only occurs in list objects in the object content portion. In the list point blocks, the NML code 0x04 is followed by the coding for the text to be displayed for this list point in a line of the list on the screen of the display. FIG. 4*c* exemplarily shows an example for a coding of a text information object at the example for the list object of FIG. 6*c*. The list point blocks are indicated at 208*a*, 208*b*, and 208*c*.

After having described various embodiments for text information objects for illustrating the NML codes with reference to FIGS. 4*a* to 4*c*, the coding of the text information in the individual blocks 204*a* to 204*c*, 206 and 208*a* to 208*c* will be described with reference to FIGS. 4*d* and 4*e*.

A block in the content portion may have several escape sequences, which are not supposed to be displayed to the user immediately. Instead, escape sequences may include rendering hints for the display, such as a hint on a text portion to be highlighted, a forced line folding, a preferred line folding, etc., or mark portions of text not intended for direct image rendering, such as binary code, i.e. things that have to be ignored by receivers not capable of processing these data portions.

Escape or ESC codes may for example be:

| ESC code | Name | Description |
|---|---|---|
| 0x10 | preferred line folding | If applicable, e.g. if the radio is equipped with a multi-line screen or a certain rendering device, the receiver or its display is supposed to display the text following the code 0x10, beginning in a new line. If not applicable for a certain type of rendering device for a display, a space character is to be inserted. |
| 0x11 | word separation location | If a word does not completely fit in the end of a screen line, the receiver may insert a hyphen sign and a line folding at this position on the reception side at the occurrence of 0x11: Otherwise, this code is ignored, without being replaced by another sign. The code 0x11 is particularly recommendable with words of more than 15 letters. |
| 0x12 | highlighting start | If applicable, the text between the "start highlighting" and the "stop highlighting" |
| 0x13 | highlighting stop | codes is to be displayed in highlighted form according to the rendering capabilities of the receiver or its display on the reception side. These codes also are to be simply ignored if the rendering device (not shown in the figures) of the display is not capable of highlighting on the reception side. |
| 0x1A | data portion start | These escape codes specify a portion within the text not to be rendered by news service |
| 0x1B | Data portion continuation | receiver 12 not capable of evaluating the data portion. The data portion may for example include HTML/XML-compliant labels or binary data. Each of these two codes or codewords is followed by a byte specifying the length of the following data portion in "number of bytes minus one". An example text with such data portions could for example be "this is a <big> great </big> test!", wherein the representation without "data portion" escape sequence would be "this is a <big> great </big> test!" and the intended illustration on a simple receiver "this is a great test!". In the first case, the display would consequently be capable of taking into account and executing the commands given in brackets in the display, i.e. writing the word "great" in bold face or big in another way in this case. An example for the excerpt from an object content portion coding this text sequence is shown in FIG. 4d, for example. If the data portion comprises more than 256 bytes, the escape code "data portion continuation" is inserted, namely directly after the preceding data portion, in order to extend the data portion by a maximum of 256 bytes with each repetition. A coding example for this is shown in FIG. 4e. The embodiments of FIGS. 4d and 4e may thus be used for displaying the text passages in the blocks 204a to 204c, 206 and 208a to 208c for correspondingly equipped receivers with corresponding displays in special manner. |
| 0x1C | extension code beginning | These escape codes enable the signaling of extended escape sequences. Each of these two |
| 0x1D | extension code end | codes or codewords is followed by an extended code value of one byte length. These extended code values are provided for additional innovations, so as to be downward compatible for old receivers. If an "extension code" exists in a "beginning" and an "end" version, (e.g. if an "extension code value" 0x00 = <bold>) with the necessity to signal both <bold beginning> and <bold end>, the same "extension code value" is used: In the first case, it is continued with the "extension code beginning" escape code, in the second case with the "extension code end" escape code. If an "extension code" only contains a single code without explicit beginning/end version, it is always to be continued with the "extension code beginning" escape code. If a receiver is not capable of interpreting "extension codes", it may ignore the "extension code beginning/end" escape code (1 byte) as well as the following "extension code value" (1 byte). |

Consequently, the construction of the text information objects has previously been described with reference to FIGS. 2 to 6. The text information objects are transmitted in the broadcasting signal 16 by the transmitter 10 and parsed in the control means 26 by means of a decoder or parser (not shown) contained therein in the manner explained with reference to FIGS. 3 and 4. Moreover, the control means 26 includes image rendering means, not shown, generating suitable data, such as pixel data, then sent to the display 30 from the parsed text information in the object content portion of the text information object to be displayed. It is to be pointed out, however, that the distribution concerning the image generation or rendition and text extraction from the text information object to be displayed may also be proportionally displaced to the display 30, or that specially provided modules are connected between control means 26 and display 30.

Figure 4:
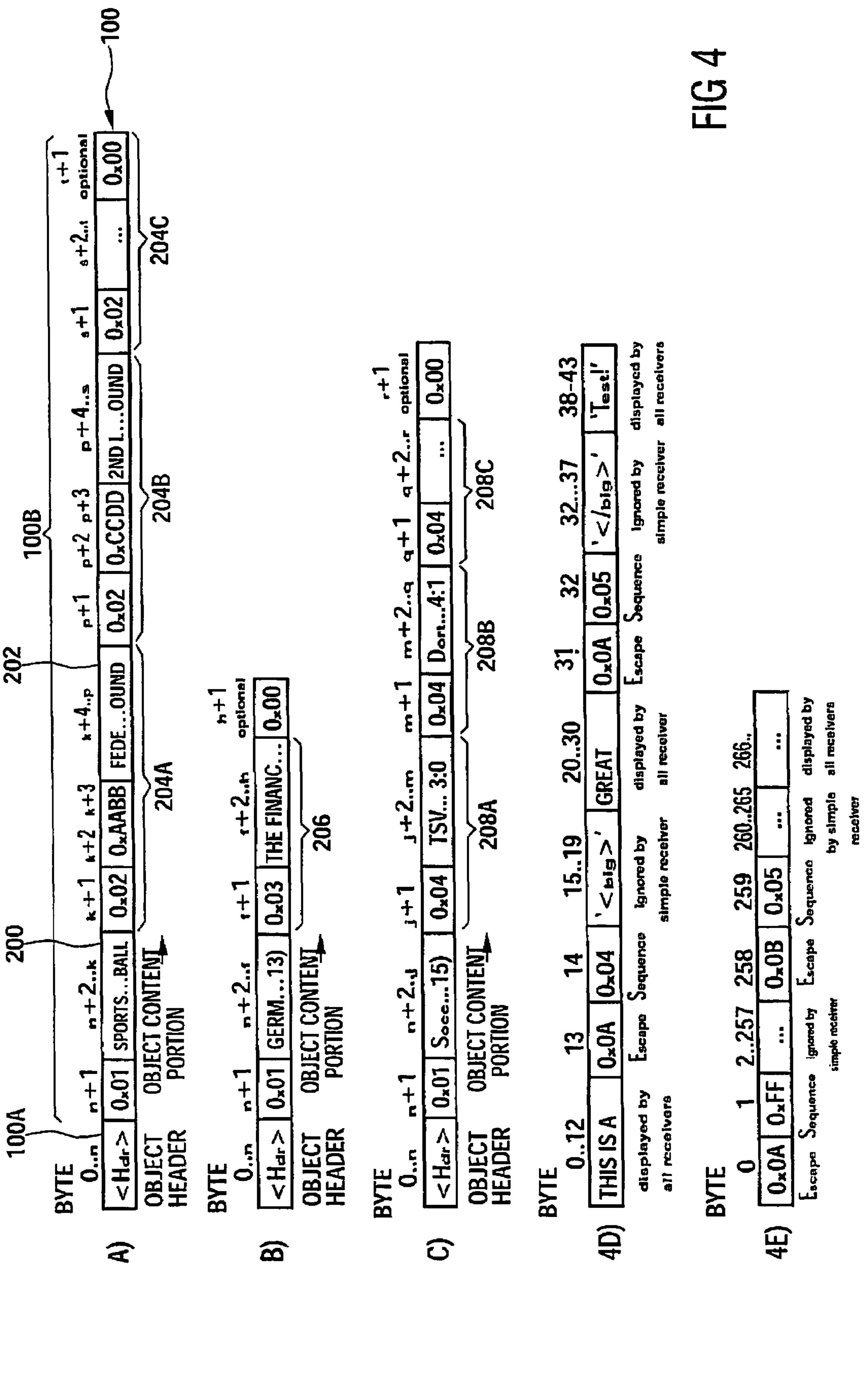
FIGS. 4*a-e* are schematic drawings for illustrating the construction of exemplary text information objects or of parts thereof by NML and UTF-8 codes.
Figure 5:
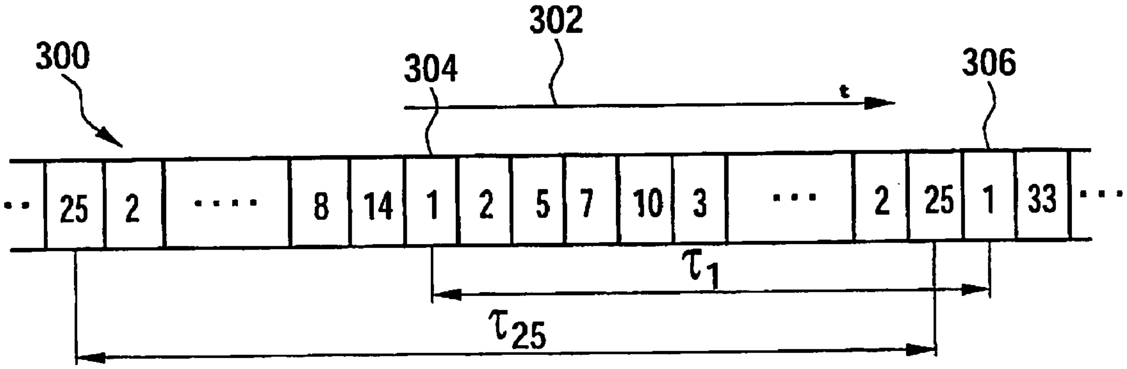
FIG. 5 is a schematic drawing for illustrating the serial and cyclical transmission of the text information objects in the broadcasting signal of FIG. 1.

While FIGS. 3 and 4 deal with the construction of a single text information object, it is described in which order the text information objects are transmitted in the broadcasting signal 16 with reference to FIG. 5. FIG. 5 exemplarily shows an excerpt from a broadcasting signal 16 in a line 300. With an arrow 302, it is indicated which part of the broadcasting signal 16 is broadcast earlier or later, i.e. the left part prior to the right part according to FIG. 5. Within the broadcasting signal 300, individual text information objects are indicated by blocks. Each text information object is numbered. The number is supposed to be the object ID associated with the text information object.

Although this is illustrated in FIG. 5 as if the text information objects were broadcast after each other in time, it is of course possible that the broadcast of individual text information objects takes place quasi-simultaneously in time. Nevertheless, an order is defined in any case among the text information objects, namely by the serial forwarding of text information objects broadcast and received at the antenna 38 by the receiver 12, so that the illustration in FIG. 5 is also applicable for this case. Hence, the text information objects are successively arranged in the broadcasting signal 300 in a certain order. The transmitter 10 repeatedly broadcasts each text information object depending on priority with a certain frequency. In FIG. 5, for example, the text information object with the object ID 1 with the repetition time duration $\tau_1$ and the one with the object ID 25 with $\tau_{25}$. The frequency or repetition time duration depends on the frequency to be expected, with which the respective text information object is desired by users of terminals, i.e. more frequently for weather news than for special national or international news. To this end, the service operator constantly updates the text information objects in the memory 18. On the one hand, this means adding text information objects to the list 22 with assignment of new object IDs. But this has to be accompanied by the change of at least one menu object, which now has to comprise a further menu point or a further menu option with a reference to this new text information object. For this reason, a change of the corresponding entry in the list 22 on the corresponding object ID of this changed menu object also takes place. For example, letting the object with the object ID 1 in FIG. 5 be this menu object to be changed, this would have changed at the next broadcast after the cycle time duration $\tau_1$, and particularly the revision index would be incremented, as described previously. For example, if in FIG. 5 the text information object 304 with the object ID 1 is the text information object the text information of which is currently displayed on the display 30 and the text information object 306 with also the object ID 1 the text information object just received by the receiver 12, the receiver may determine whether an update is necessary or not on the basis of the revision index of the text information object 306 and comparison thereof with the revision index of the text information object 304. Within a certain overall repetition time duration not illustrated in FIG. 5, each text information object is broadcast at least once.

It is to be pointed out that it becomes obvious from the description of FIG. 5 that the term "text information object" is used ambiguously in the present description: On the one hand, it denotes an object transmitted in the broadcasting signal, but on the other hand also all objects with a special object ID. Thus, strictly speaking, not text information objects, but object Ids are arranged in the tree structure in FIG. 2. Each object ID represents several successively broadcast text information objects, namely the ones with the corresponding object ID. These do not all have to be identical themselves, but may be updated in the course of time. Nevertheless, it becomes clear from the context, in which way the term "text information object" has just been used.

Having now previously described the "NewsService Journaline" service with reference to FIGS. 1 to 6, including the construction of the text information objects and the way of broadcast thereof, the functioning of the receiver 12 will be described in greater detail in the following on the basis of FIGS. 7 to 13 according to an embodiment of the present invention.

Figure 7:
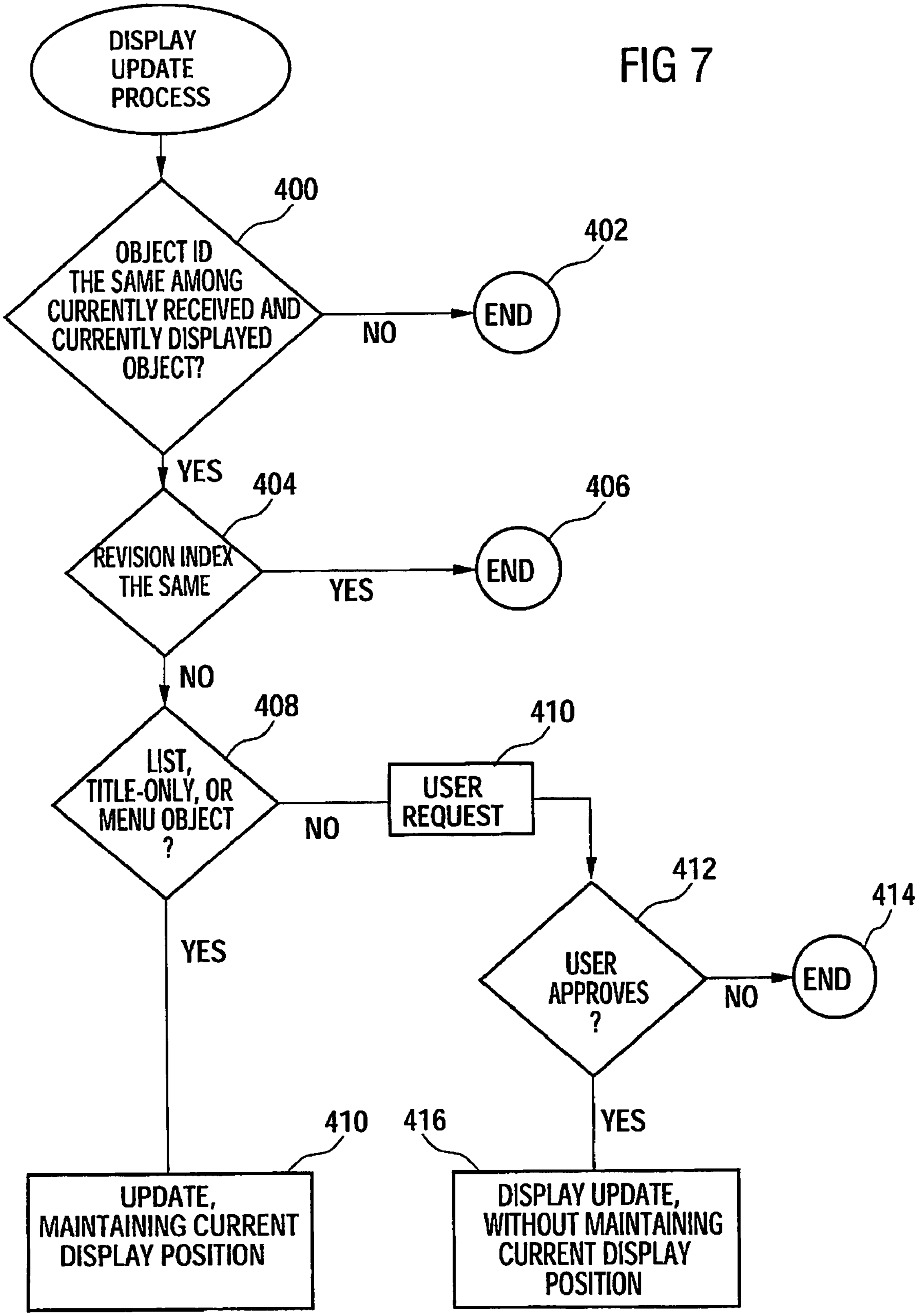
FIG. 7 is a flow chart of an update display process according to an embodiment of the present invention.

FIG. 7 shows how the control means 26 examines a text information object just received as to whether an update of the screen content of the display 30 is to be performed or not, in a display update process. Upon the input of a text information object, the control means 26 now at first checks if the object ID of a currently received text information object is identical with the object ID of a currently displayed text information object, in a step 400. This would mean that the newly received text information object could contain potential changes with respect to the older one currently displayed. If the comparison in step 400 does not yield identity, the display update process ends at 402, in order to restart on reception of the next received or subsequent text information object. If there is identity in step 400, it is checked whether the revision index (110 in FIG. 3) resembles itself in the currently received and the currently displayed text information object, by the control means 26 in step 404. If this is the case, this means that it can be assumed on the reception side that no changes with respect to this object ID have resulted in terms of content. Upon determination of the identity in step 404, the display update process consequently ends at 406, in order to restart with the text information object received immediately afterwards. But if there is inequality in step 404, the control means 26 checks the object type ID (108 in FIG. 3) in a step 408, namely either of the currently received or the currently displayed text information object, as to whether it displays a list, menu or title-only object type, i.e. is 0x1, 0x3, or 0x4. If this is the case, the newly received text information object is now displayed on the display 30 in a step 410, whereby the text information on the display 30 is updated.

In the update in step 410, a display controller (not shown) takes care that the current scroll position of the user is maintained. This avoids that the user, who has just scrolled through or searched a part in a list or a menu with an effort, has to start again from the beginning at an update. With a menu object, the update of step 410 thus leads to the fact that a menu option line of the menu prior to the update, such as the line 172*b* in FIG. 6*d*, also has the same screen position after the update, provided that the new menu object comprises sufficient lines or sufficient menu options, or that it still comprises this menu option at all. In the case of a list object, the update according to step 410 correspondingly leads to the fact that a list line of the list prior to the update is displayed at the same screen position as after the update, provided that the new list object comprises enough lines. For example, the update of step 410 is performed such that the umpteenth menu option or umpteenth list line appears at the same screen position before and after the update. This also means that the displayable area at least partially overlaps before and after the update, so that confusions for the user are avoided at an update.

Alternatively, for example, the object ID of the menu entry or the text of the menu or list entry may also be used for the identity check of an entry in the new object with the currently displayed entry of the presently displayed object.

In the case of a title-only object, it may, however, be provided in step 410 to simply display the updated text content of the newly received object like a new object with new object ID, because title-only messages do not have a greater text body per definition anyway. Potential renewed "screen scrolling" does not do any harm.

With list, menu, and title-only objects, the update according to 410 thus takes place immediately, automatically, and without the user having to give permission. With text objects, however, it may be tedious when the user is again put back from his or her instantaneous reading position in a continuous text or the currently read-out content is no longer contained in the updated object. For this reason, in case the check at 408 shows that the currently displayed or the currently received text information object is not a list, menu, or title-only object, but hence a text object, the user is informed that an updated version of what he or she is just reading is present, such as via an inquiry via the display 30 or via a blinking lamp, a blinking "update" on the screen of the display 30 or another means. Hereby, the user is at the same asked whether he or she wishes an update or would like to avoid such or rejects it. The user may express approval via the panel 34, such as by pressing a certain key, or by another actuation means. The rejection may consist in a no-reaction actuation or operation, such as not pressing a key. The possibility that the user expresses his or her approval may also be limited in time, such as by a maximum approval time duration. In a step 412, the control means checks whether the user gives his or her approval or not. In the case that the user rejects an update, the display update process ends until its restart at 414. Otherwise, a display update takes place 416. The display update in step 416, however, takes place without maintaining the current display position as in step 410, but preferably as when displaying a text information object with new object ID from the beginning, i.e. in a position scrolled to the beginning.

Figure 8:
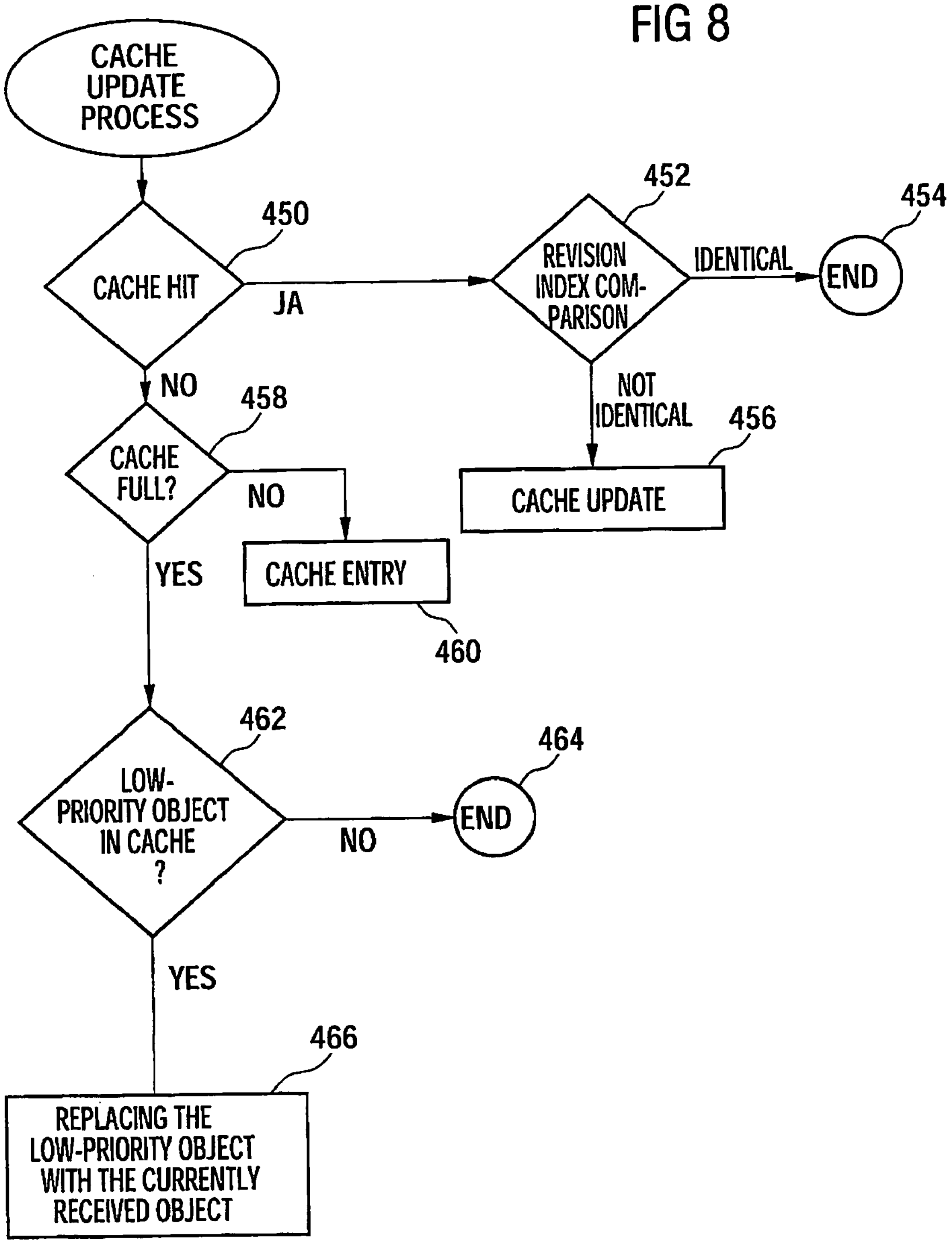
FIG. 8 is a flow chart of a cache update process according to an embodiment of the present invention.

FIG. 8 shows a further process constantly executed by the control means 26 upon arrival of a newly received text information object. The process of FIG. 8 is a cache update process. The cache update process of FIG. 8 serves the purpose that the receiver 12 always comprises at least part of the already received text information objects, more specifically, for each object ID, the text information object with the latest available version, for quick display or quick access. For cache update, the control means 26 at first checks, in a step 450 on the basis of the object ID of the newly received text information object, whether a text information object with this object ID is contained in the list 22 in the memory 32. If this is the case, i.e. in case of a cache hit, it is checked whether the revision index of the newly received text information object differs from the revision index of the text information object stored in the memory 32 and comprising the same object ID, in a step 452. If the step 452 yields the identity of the two revision indices, the cache update process ends at 454, in order to start again from the beginning upon arrival of the subsequent text information object. If the check in step 452 shows that the revision index of the newly received text information object differs from the one in the cache memory 32, the replacement of the corresponding entry in the list 42 by the newly received text information object takes place in step 456.

But if the step 450 shows that no entry with such an object ID is present in the list 42 of the cache memory 32, i.e. a cache miss, the control means 26 checks in a step 458 whether the memory space provided for the list 42 in the memory 32 is full or whether there is still enough memory space to make an entry in the list 42. If the cache is not full, the control means 26 enters the newly received text information object in the list 22 or the cache memory 32 in a step 460. But this will only be the case in the beginning phase after the switch-on of the receiver 12 or the "NewsService Journaline" functionality of the receiver 12. After a certain time, the cache memory 32 will be full. In this case, the control means 26 checks, in a step 462 according to a certain cache displacement strategy, as it will be explained in greater detail in the following with reference to FIG. 9, whether there is a text information object having a lower cache priority than the newly received one in the cache memory 32 in the list 42. The check 462 takes the tree structure of the text information objects into account and defines a priority order among the text information objects, depending on whether it is referred to them by the currently displayed text information object or a text information object in the data path between the root object or main object and the currently displayed text information object or not, or stated more generally, due to a position in the tree structure or its relative location with respect to the currently displayed text information object within the tree structure. In addition, the time instant of the last reception or content update, or the frequency of reception or content update may be evaluated among objects of equal cache priority.

Figure 9:
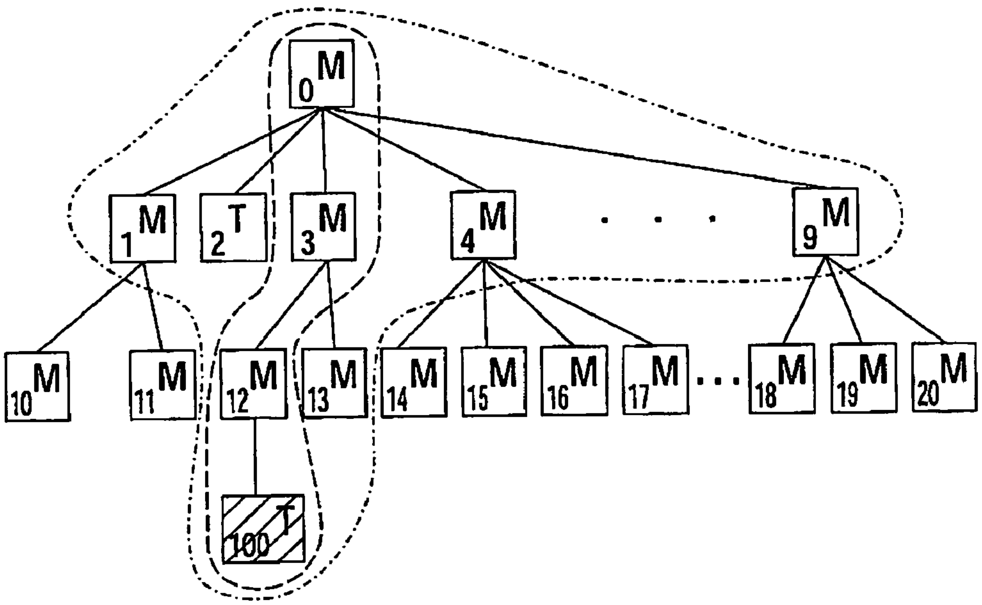
FIG. 9 is a schematic outline of an exemplary tree structure of text information objects for illustrating the cache displacement strategy according to an embodiment of the present invention.

So as to illustrate this, an object tree is again exemplarily illustrated in FIG. 9, wherein menu objects are again characterized with M and text objects with T. All menu objects are numbered by a number at the lower left corner, which is supposed to indicate the object ID. Let the currently displayed text information object be the text object with the object ID 100. It is in the fourth hierarchic level. In order to reach the currently displayed text object with the object ID 100 by references from the main object with the object ID 0, the user had to pass through the text information objects or the menu objects with the object ID 3 in the second hierarchic level and the object ID 12 in the third hierarchic level. The sequence of object IDs of the text information objects from the main object with the object ID 0 to including the currently displayed object with the object ID 100, together with menu objects lying therebetween on the way in the object tree, form the object path 44 the receiver 12 stores in the memory 32 and still described in greater detail later. Actually, it is established in order to enable the user to return to higher menu levels, and is therefore also stored with each "favorite". In the present exemplary case, the object path is {0, 3, 12, 100}. All objects the object IDs of which are contained in the object path 44 (FIG. 1) are encircled by a dashed line in FIG. 9. In addition to the object path 44 objects, all objects to which at least one of the objects in the object path refers are framed by a dash-dotted line in FIG. 9; in the example of FIG. 9, these are the objects with the object IDs 1, 2, 4, . . . , 9, 13. Only as an example, the currently displayed text information object was a text object in the example of FIG. 9. If it was a menu object, also objects lying in the fifth hierarchic level of the object tree would be enclosed by the dash-dotted line.

The cache displacement strategy according to which a priority order is determined among the objects proceeds as follows:

1. Text information objects outside the dash-dotted line, i.e. text information objects to which not at least one of the text information objects in the object path (indicated by the dashed line) refers, have the lowest priority. In the example of FIG. 9, these are the text information objects 10, 11, 14 to 20.
2. Text information objects between the dash-dotted line and the dashed line have a next higher priority. Thus, these are the objects that are not on the object path but to which at least one object in the object path refers.
   2.1. Among these objects, in turn a priority order is defined, such that objects in a higher hierarchic level have higher priority than such ones in a lower hierarchic level, i.e. in the example of FIG. 9, the object with the object ID 13 has higher priority than the ones with the object IDs 1, 2, 4 to 9.

2.2 Among those of equal priority, then menu objects should again have higher priority than the other object types. The object with the object ID 2 would thus have lower priority than the objects with the object ID 1, 4 to 9.

2.3 Among the remaining ones with equal priority, a priority order could again be defined by assigning higher priority to objects in which the static flag is set than to those with the static flag not set.

3. The menus or objects in the object path again include a next higher priority, presently consequently the objects with the object IDs 0, 3, 12, and 100. Among these, a priority order depending on the hierarchic level could again be defined.

Furthermore, it could be provided that, deviating from the previously illustrated displacement strategy, special objects, namely with object IDs contained in the favorite list 46 in the memory 32, have the highest priority. Those objects to which the currently displayed object, i.e. with the object ID 100, refers could have the highest priority. Furthermore, objects in the dash-dotted line could all be treated the same, the objects of the object path thus also be treated the same as the objects to which they refer, i.e. point 3 would be missing.

Returning to FIG. 8, the cache update process ends at 464 if it is determined at step 462 that no object with lower cache priority exists in the cache memory. If such a one exists, at step 466 the object with lowest priority is replaced by the currently received object. Even if several objects with equal priority in the memory are those with lowest priority, the oldest received one should be replaced.

Figure 10:
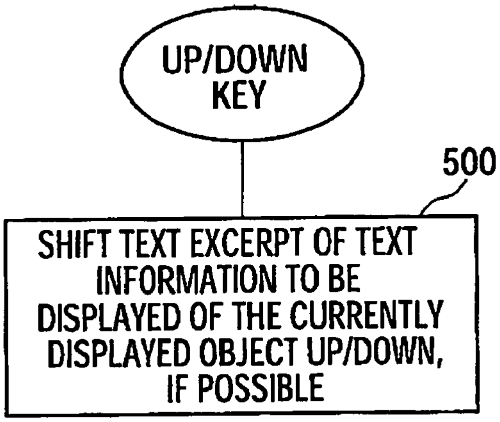
FIG. 10 is a flow chart of a scroll process according to an embodiment of the present invention.

FIG. 10 shows a process performed by the control means 26 if a user operates keys at the panel 34 provided for scrolling, such as the arrow up and arrow down key, during the display of a text information object on the display 30. In this case, the control means 26 shifts the text excerpt to be displayed of the text information of the currently displayed object downward or upward, if this is still possible, in a step 500. In the case of the menu and list objects, as described, the title is always displayed on the screen of the display.

Figure 11:
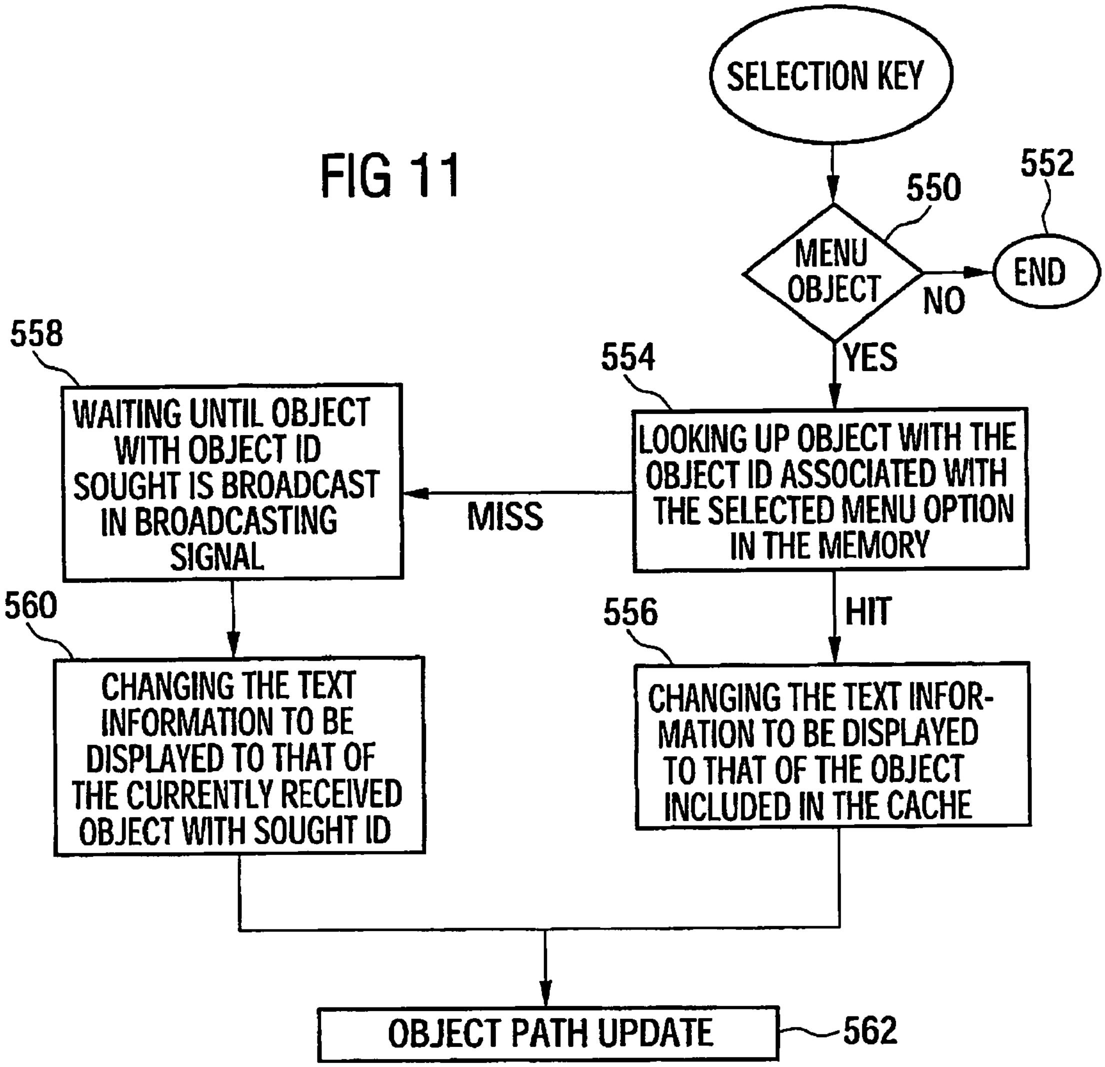
FIG. 11 is a flow chart of a menu selection process according to an embodiment of the present invention.

FIG. 11 shows a process executed by the control means 26 if the user actuates, with displayed text information object, a selection key, which may be a specially provided key on the panel 34 or is the arrow right key, for example. On actuation of this key or selection means, the control means checks whether the currently displayed text information object is a menu object or not in a step 550. If this is not the case, the selection key is not occupied, i.e. no function is assigned to it, and the process of FIG. 11 ends at 552. If it is a menu object, the control means 26 looks up in the memory 32 whether an object with an object ID associated with the highlighted menu option (cf. 172*b* in FIG. 6*d*) is contained therein, in a step 554. If this is the case, i.e. in the case of a cache hit, the control means 26 changes the text information to be displayed to the one of the object contained in the cache memory 32, in a step 556. Since the access to the cache memory 32 is quick, the screen change on the display 30 happens unnoticeably, i.e. immediately, for the user. If the look-up at 554, however, yields a cache miss, the control means 26 waits for an object with the sought object ID to be broadcast in the broadcasting signal 16, in a step 558. During the step 558, all other processes are of course performed as usual, particularly the processes of FIG. 7 and FIG. 8 on the objects arriving in the meantime. As soon as the object with the sought object ID is received, the control means 26 changes the text information to be displayed on the screen of the display 30 to the one of the currently received object with the sought object ID, in a step 560. After the steps 560 or 556, an object path update is performed in a step 562, as it is illustrated in greater detail in FIG. 12.

Figure 12:
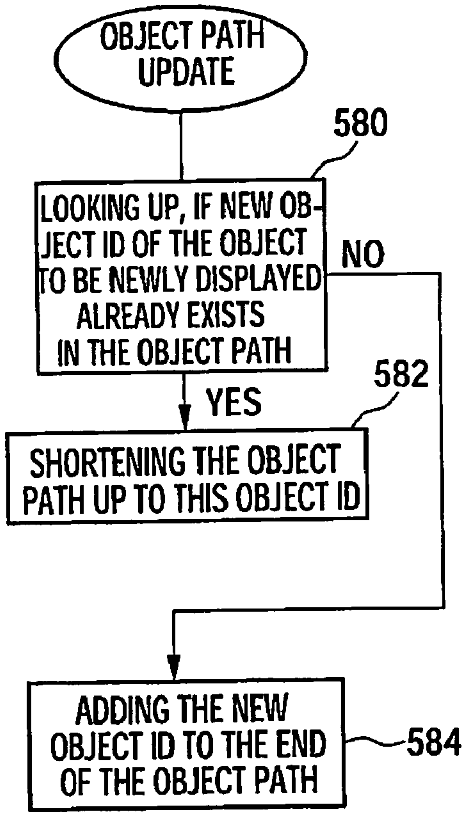
FIG. 12 is a flow chart of an object path update according to an embodiment of the present invention.

FIG. 12 illustrates the object path update process of step 562. In a step 580, it is at first looked up in the memory 32 by the control means 26 whether the new object ID, i.e. the object ID of the object now newly displayed on the display 30, which has been associated with the selected menu option, already exists in the object path 44. If this were the case, simply adding the new object ID to the end of the object path list of object IDs would lead to a circular reference. If the look-up in step 580 thus leads to a hit, the control means 26 sees to it that the object path list 44 is deleted up to this object ID, i.e. in order to end with this object ID, in a step 582. Otherwise, i.e. in the case of a miss at the looking-up step 580, the new object ID is attached at the end of the object path list 44 in a step 584, in case the object path is not length limited and has not already reached its maximum length.

The management of the object path list 44 is provided so as to enable a menu-back functionality, as it will be explained in greater detail with reference to FIG. 13, which illustrates a process the control means 26 executes upon pressing a back key, such as the left key on the panel 34, when a text information object is currently being displayed on the display 30. In this case, the control means 26 determines that object ID immediately preceding the object ID of the currently displayed object in the object path and the object of which consequently refers to the same from the object path list 44 in a step 600. Briefly referring back to FIG. 9, for example, pressing the back key would there for example lead to the fact that the object ID 12 would be determined in the step 600. Thereupon, in a step 602, the control means 26 looks up an object with this object ID in the memory 32. In the case of a cache hit, the control means 26 changes the text information to be displayed to the one of the object contained in the cache memory 32 in a step 604. Otherwise, i.e. in the case of a miss, the control means 26 waits until an object with the object ID sought is broadcast in the broadcasting signal 16 in a step 606, whereupon, as in a step 608, the text information to be displayed changes to the one of the currently received object with sought object ID. After the steps 604 and 608, the control means 26 updates the object path list 44 in a step 610 by shortening the same by the last object ID, namely the object ID of the text information object that has been displayed prior to the change 604, 608.

Figure 13:
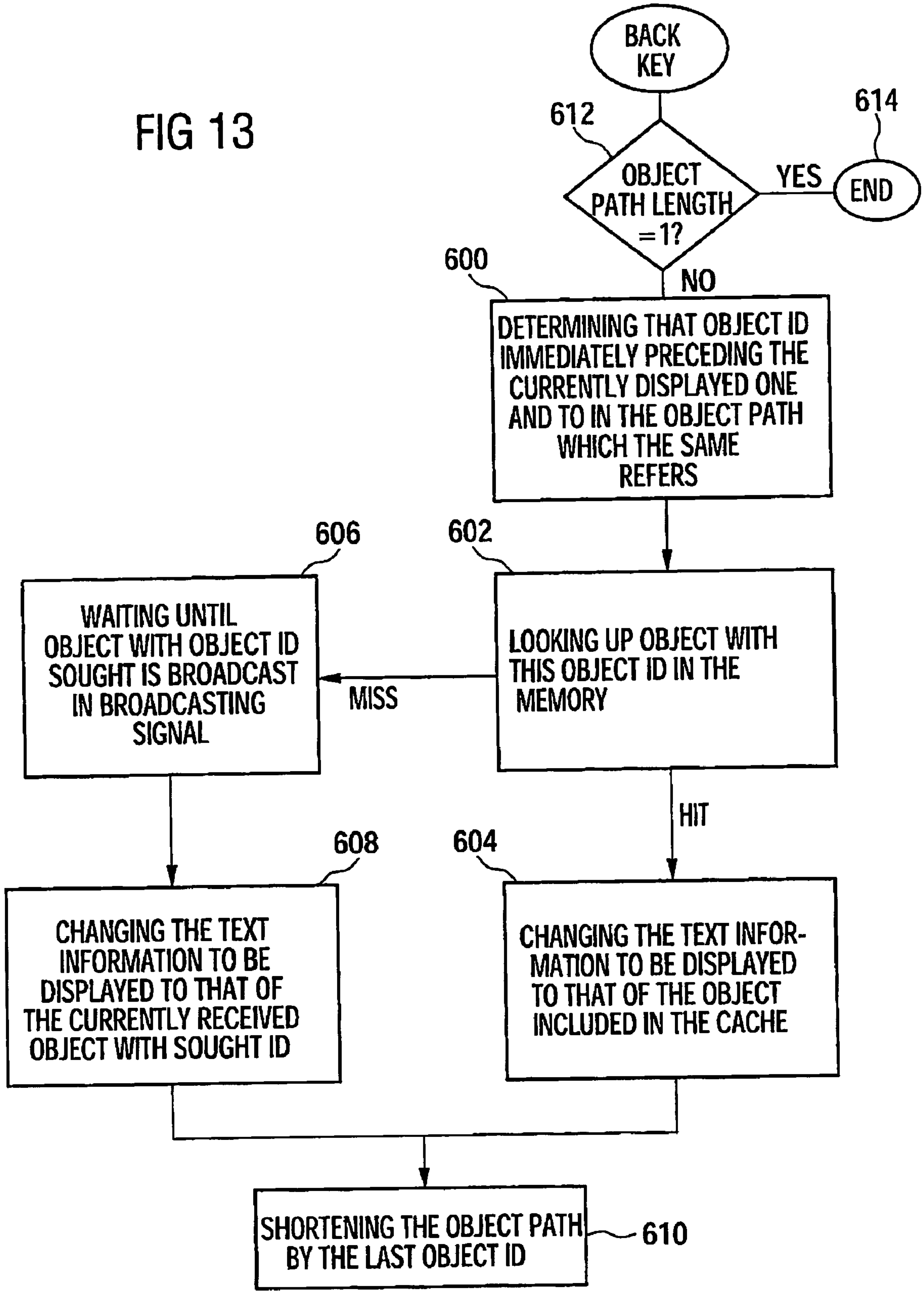
FIG. 13 is a flow chart of a one-hierarchic-level-back process according to an embodiment of the present invention.

As it is also indicated in FIG. 13, it is of course checked in a step 612, prior to the step 600, whether the object ID path 44 comprises more than one object ID at all. The length would be one if the user currently were in the main menu (i.e. e.g. 0x0000). If this were the case, the actuation of the menu-back key would remain without result, and the process would end at 614. Only otherwise would the process begin to run at 600, as described above.

Figure 14:
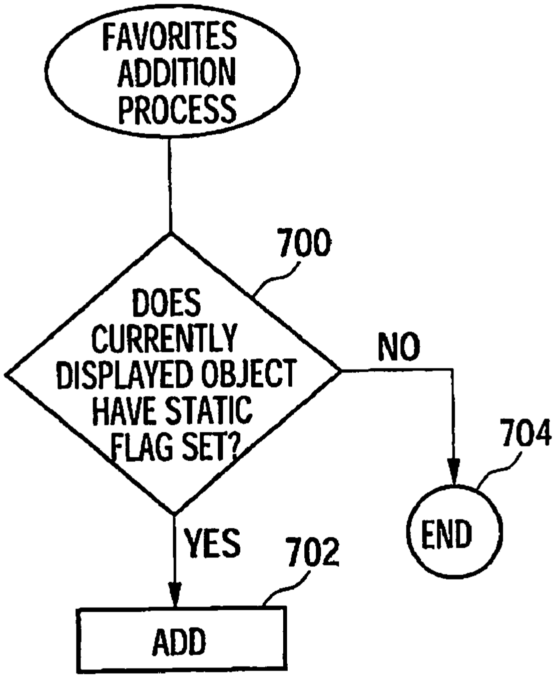
FIG. 14 is a flow chart of a favorite addition process according to an embodiment of the present invention.

According to the embodiment of FIG. 14, the receiver 12 has a favorite functionality in order to enable a user to store certain menu or message objects for quick and direct future access, by assigning the highest priority in the cache memory thereto, for example.

For realizing the favorite functionality, the receiver 12 for example includes a specially provided key by long pressing of which the user may express his or her wish to add the object ID of the currently displayed text information object to the favorite list, whereas shortly pressing the same key leads to the control means 26 using the favorite object ID in the favorite memory for the next text information object to be displayed. Of course, also other means may be provided with which the user may cause a favorite addition or a favorite call-up. FIG. 14 illustrates a favorite addition key activation control process. If the user indicates the wish of adding, in a step 700 it is at first checked by the control means 26 whether the currently displayed object comprises a set static flag. If this is the case, this means that the object ID is provided statically or constantly (e.g. theme-related) for a certain menu or a certain message object. For example, a menu object concerning "weather forecast for Bamberg" might always be offered by a certain news service under the object ID 0x0020. Consequently, in this case, it makes sense to enable the user to add such an object ID to a favorite list. Consequently, in this case, the control means 26 adds the object ID to the favorite list 46 in the memory 32 in a step 702. For example, however, this would not make sense with an object ID presently given away for a text object indicating the current standing of a soccer match presently taking place. This match namely ends in finite time, and the object ID will be given away otherwise, for example for a politics news item of the day or the like. With the static flag not set, the process therefore ends at 704 without addition. In this case, the rejection 704 may for example be accompanied by a sound louder than the normal audio signal from the loudspeaker 28 or 40 and indicating the rejection to the user, or by short-time fading.

It is pointed out that it is preferred that a receiver 12 supporting the favorite functionality also stores the full path of object IDs from the main object with the main object ID (e.g. 0x0000) up to the respective favorite object for each favorite object ID. Otherwise, the receiver will not be capable of making the menu-back functionality or return-to-a-higher-menu functionality available to a user, when a user has called up this favorite object, even though the object itself, as well as the immediate sub-objects, would of course still be reachable in the case of a menu object. Should a menu of the object ID path no longer exist (be sent) when restoring a favorite memory, the control means 26 might instead jump directly into the standard main menu (e.g. 0x0000).

In the previously described receiver, a recording of all menu object IDs from the instantaneously displayed menu/news object back to the main menu object (e.g. object ID 0x0000) has been preserved, the so-called object ID path. In this way, it may provide a "back to higher menu level" functionality.

If an object with a certain object ID is displayed or presented to the user at the moment and at the same time an updated version of the same object, i.e. an object with identical object ID but different revision index, is received, it could always at first be displayed to the user that such a current version of the object has been received, such as by showing a blinking "update" sign on the screen, independent of the object type, contrary to previous description. It is preferred, however, to update the screen of the display immediately with the content of the new object, with menu or list message objects, while the current relative position of the user within the list, i.e. the list line index, is maintained at the same position in the screen. Instead of the list line index, a receiver also might evaluate the list line or topic text, or in the case of a menu object, the object ID of the object to which it is being referred. For a title-only message, it is preferred to immediately make the update of the screen of the display with the content of the new object.

If a menu object contains references to object IDs not yet received, these menu points or menu options are nevertheless offered to the user. Of course, this might also not take place. It is preferred, however, to offer all menu options, but clearly displaying to the user, which menu options are immediately available, since the objects have already been received and are in the cache memory, and which ones are not immediately available at once, such as by framing the menu option label or title with square brackets, as shown in FIG. 6*d*.

In applications with extreme memory shortages, the receiver could just keep the currently displayed object along with the object ID path belonging to the currently displayed object in its memory. If the user then requests another object, he or she has to wait until the requested object will be received in the next time.

As already mentioned, the above-described "NewsService Journaline" service may be broadcast via DAB as a new user application. Every single "NewsService Journaline" object could be transported as an "MSC data group", to this end reference being made to chapter 5.3.3 "Packed Mode—Data Group Level" in "Radio Broadcasting Systems, Digital Audio Broadcasting (DAB) to mobile, portable and fixed receivers", ETSI EN 301 401 V1.3.2, 2000-09.

An MSC data group would then contain the following points: An MSC data group header at two or four bytes, a session header, which would be optional and 3+n bytes long, an MSC data group field containing a "NewsService Journaline" object or text information object, namely of m bytes, for example, but a maximum of 2044 bytes, and finally an MSC data group CRC at two bytes, which is mandatory for "NewsService Journaline".

The following adjustments could be uniformly defined for all receivers. It could be defined that the MSC data group header field has the following layout:

extension flag=0
- (With the flag set to one, the receiver would have to support conditional access or access control in order to decode the information. If a receiver does not support conditional access, it would have to discard the MSC data group)

CRC flag=1 segment flag=0
- (value depends on the extension flag)

user access flag=0
- (value depends on the extension flag)

data group type=$0000_b$
- ("general data")

continuity index:
- Increments continuously for each object, but may easily be ignored.

repetition index:
- Will usually have the value 000b, but may also be ignored.

extension field:
- Not present because the extension flag is adjusted to 0.

The following information could be used to signal the DAB data application "NewsService Journaline", with reference being made for this purpose to chapter 8.1.20 "User Application Information" from the above document or standard.

The main 11-bit "user application type" ID for the "NewsService Journaline" could be 0x44A from the area of proprietary user applications until official standardization by DAB panels. The value corresponds to $10001001010_b$.

The user application data field could have the following structure:

One byte for displaying the version of the "NewsService Journaline". Additional information of a later version could be added in completely downward-compatible manner at two places, on the one hand in the entire service signaling, namely the "DAB user application information" by extending the length of the "user application data" portion, maintaining all existing bytes and their definition, as it is defined in every preceding version of the "NewsService Journaline", or in the object header portion of every single object by extending the length of the "extension header" field, while maintaining all existing bytes and their definition, as they are defined in a preceding version of the "NewsService Journaline".

Moreover, the user application data field would have to have the length of the extension header in bytes in the header portion of each object, which every receiver would have to be capable of reading, even if it then discards the data in the extension header, because it is not capable of its evaluation.

With identical signaling, "NewsService Journaline" may also be broadcast via DRM ("Digital Radio Mondiale"), as well as via VHF/RDS after adaptation of the data service signaling.

With reference to the preceding description of the figures, it is pointed out that various aspects contained therein do not all have to be combined in the manner described, but that these aspects may be implemented or not implemented independently of each other, such as particularly the object path management with accompanying "menu-back" functionality, the cache memory update for speeding up the access to other text information objects, the dependence of the display update on the revision index, the dependence of the update on the object type, the favorite functionality, the avoidance of circular references in the object ID path, the different screen update depending on the object type, the provision of the revision index, and the like.

Finally, it is pointed out that, independent of the conditions, the inventive scheme for controlling a radio may also be implemented in software. The implementation may take place on a digital storage medium, particularly a floppy disc or CD with electronically readable control signals capable of cooperating with a programmable computer system so that the corresponding method is executed. In general, the invention thus also consists in a computer program product with program code stored on a machine-readable carrier for performing the inventive method, when the computer program product is executed on a computer. In other words, the invention may thus also be realized as a computer program with program code for performing the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A broadcast receiver, comprising a receiver for receiving a broadcasting signal including text information objects in which text information is contained, wherein the text information objects are arranged successively in time in the broadcasting signal, and each text information object comprises an object identification number;

a display for displaying text information to be displayed;

a user selector operable by a user;

a cache memory for temporarily storing text information objects already received;

a controller configured to change the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and a cache displacer for comparing the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is configured to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored.

2. The broadcast receiver of claim 1, further comprising:

an updater for comparing the object identification number of a text information object following the currently displayed text information object with the object identification number of the currently displayed text information object, and updating the text information to be displayed by changing the currently displayed text information of the currently displayed text information object to text information of the following text information object depending on the comparison.

3. The broadcast receiver of claim 2, wherein each text information object comprises a revision index, and wherein the updater is configured to compare the revision index of the text information object following the currently displayed text information object with the revision index of the currently displayed text information object, and to perform the update only with equal object identification number and unequal revision index.

4. The broadcast receiver of claim 2, wherein each text information object further comprises an object type identifier, and wherein the updater is configured to perform the update also dependent on the object type identifier of the currently displayed or the following text information object, namely depending on the same immediately or after a user inquiry.

5. The broadcast receiver of claim 2, wherein the display is configured to display an excerpt of the text information of the following text information object, which at least partly overlaps with an excerpt the display showed prior to the update, at an update in case the amount of text information of the following text information object is greater than a displayable quantity.

6. The broadcast receiver of claim 1, wherein the currently displayed text information object is a menu object, and the currently displayed text information includes a list of menu options, wherein the menu object comprises an associated object identification number for each menu option, wherein the controller is configured to change the text information to be displayed from the currently displayed text information of the currently displayed text information object to text information of a text information object having the same object identification number as that associated with a menu option highlighted as selected, depending on the operation of the user selector by the user.

7. The broadcast receiver of claim 6, further comprising a user-operable scroller, wherein the controller is configured to change the menu option currently highlighted as selected to another one of the menu options depending on the operation of the scroller by the user.

8. The broadcast receiver of claim 1, further comprising:

a cache updater for comparing the object identification number of a currently received text information object in the broadcasting signal with the object identification number of each text information object stored in the cache memory, and replacing a stored text information object the object identification number of which matches the one of the text information object currently received in the broadcasting signal with the text information object currently received.

9. The broadcast receiver of claim 1, wherein the controller is configured to at first look up the other text information objects to which the currently displayed text information object refers in the cache memory using the object identification number at a change of the text information to be displayed, and wait until the same is received in the broadcasting signal only in case of a miss.

10. The broadcast receiver of claim 1, further comprising:

a cache hit identifier, comprising a look-up unit for looking up, for each object identification number to which the currently displayed text information object refers, whether a text information object with the object identification number is present in the cache memory; and a highlighter for highlighting, among the currently displayed text information, such parts associated with identification numbers for which a text information object is present in the cache memory, as opposed to such parts in the currently displayed text information with which identification numbers for which no text information object is present in the cache memory are associated.

11. The broadcast receiver of claim 1, wherein each text information object comprises a static flag, wherein the broadcast receiver further comprises:

a favorite caller operable by the user;

a user adder operable by the user;

a favorite memory for storing an object identification number;

wherein the controller is configured to change the text information to be displayed from the currently displayed text information to text information of a text information object having the same object identification number as the one stored in the favorite memory depending on an operation of the favorite caller by the user, and wherein the controller is configured to examine the static flag of the currently displayed text information object depending on the operation of the favorite adder by the user, and to ignore the operation in case the static flag is not set, and to enter the object identification number of the currently displayed text information object into the favorite memory in case the static flag is set.

12. The broadcast receiver of claim 1, wherein the controller is configured to perform the storage by overstorage of a text information object to be overstored among the ones stored in the cache memory, as prescribed by a displacement strategy which takes the tree structure of the text information objects into account and defines a priority order among the text information objects depending on whether or not, a respective text information object is referred to by the currently displayed text information object or a text information object within the tree structure laying on a data path extending between a root object of the tree structure and the currently displayed text information object.

13. The broadcast receiver of claim 1, wherein the text information objects are arranged in the tree structure via the object identification numbers thereof and references of the text information objects to each other, used by the controller in changing the text information to be displayed.

14. The broadcast receiver of claim 1, wherein the broadcast receiver is a carousel broadcast receiver and the text information objects are arranged the broadcasting signal in a carousel.

15. A method of controlling a broadcast receiver having a receiver for receiving a broadcasting signal including text information objects in which text information is contained, a display for displaying text information to be displayed, a user selector operable by a user, and a cache memory for temporarily storing text information objects already received, wherein the text information objects in the broadcasting signal are successively arranged in time, and each text information object comprises an object identification number, comprising the steps of:

changing the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and comparing the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is configured to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored.

16. The method according to claim 15, wherein the storage is performed by overstorage of a text information object to be overstored among the ones stored in the cache memory, which is prescribed by a displacement strategy which takes the tree structure of the text information objects into account and defines a priority order among the text information objects depending on whether or not, a respective text information object is referred to by the currently displayed text information object or a text information object within the tree structure laying on a data path extending between a root object of the tree structure and the currently displayed text information object.

17. The method according to claim 15, wherein the text information objects are arranged in the tree structure via the object identification numbers thereof and references of the text information objects to each other, used in changing the text information to be displayed.

18. A computer program with program code stored on a machine-readable medium for performing, when the computer program is executed on a computer, the method of controlling a broadcast receiver having a receiver for receiving a broadcasting signal including text information objects in which text information is contained, a display for displaying text information to be displayed, a user selector operable by a user, and a cache memory for temporarily storing text information objects already received, wherein the text information objects in the broadcasting signal are successively arranged in time, and each text information object comprises an object identification number, comprising the steps of:

changing the text information to be displayed from currently displayed text information of a currently displayed text information object to text information of a text information object to which the current text information object refers, depending on an operation of the user selector by the user, wherein the object identification number of the current text information object differs from the object identification number of the text information object to which the same refers; and comparing the object identification number of a currently received text information object in the broadcasting signal with the object identification number of each text information object stored in the cache memory, and storing the currently received text information object in the broadcasting signal if the object identification number thereof matches the object identification number of none of the text information objects stored, wherein the text information objects are arranged in a tree structure and the controller is configured to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein, among the text information objects stored in the cache memory, those with lower priority than the currently received text information object are eligible as potential text information objects to be overstored.

19. A receiver, comprising a receiving means for receiving a signal including text information objects in which text information is contained, wherein the text information objects are arranged successively in time in the signal, and each text information object comprises an object identification number (ID);

a display for displaying text information to be displayed;

a user selector operable by a user;

a controller configured to change the text information to be displayed from currently displayed text information of a currently displayed text information object to text information of a text information object to which the current text information object refers, depending on an operation of the user selector by the user, wherein the object ID of the current text information object differs from the object ID of the text information object to which the same refers;

wherein each text information object comprises a static flag, wherein the receiver further comprises:

a favorite caller operable by the user;

a user adder operable by the user;

a favorite memory for storing an object ID;

wherein the controller is configured to change the text information to be displayed from the currently displayed text information to text information of a text information object having the same object ID as the one stored in the favorite memory depending on an operation of the favorite caller by the user, and wherein the controller is further configured to examine the static flag of the currently displayed text information object depending on the operation of the favorite adder by the user, and to ignore the operation in case the static flag is not set, and to enter the object ID of the currently displayed text information object into the favorite memory in case the static flag is set.

20. The receiver of claim 19, further comprising:

an updater for comparing the object identification number (ID) of a text information object following the currently displayed text information object with the object ID of the currently displayed text information object, and updating the text information to be displayed by changing the currently displayed text information of the currently displayed text information object to text information of the following text information object depending on the comparison.

21. The receiver of claim 20, wherein each text information object comprises a revision index, and wherein the updater is configured to compare the revision index of the text information object following the currently displayed text information object with the revision index of the currently displayed text information object, and to perform the update only with equal object ID and unequal revision index.

22. The receiver of claim 20, wherein each text information object further comprises an object type identifier, and wherein the updater is configured to perform the update also dependent on the object type identifier of the currently displayed or the following text information object, namely depending on the same immediately or after a user inquiry.

23. The receiver of claim 20, wherein the display is configured to display an excerpt of the text information of the following text information object, which at least partly overlaps with an excerpt the display showed prior to the update, at an update in case the amount of text information of the following text information object is greater than a displayable quantity.

24. The receiver of claim 19, wherein the currently displayed text information object is a menu object, and the currently displayed text information includes a list of menu options, wherein the menu object comprises an associated object ID for each menu option, wherein the controller is configured to change the text information to be displayed from the currently displayed text information of the currently displayed text information object to text information of a text information object having the same object ID as that associated with a menu option highlighted as selected, depending on the operation of the user selector by the user.

25. The receiver of claim 24, further comprising a user-operable scroller, wherein the controller is configured to change the menu option currently highlighted as selected to another one of the menu options, depending on the operation of the scroller by the user.

26. The receiver of claim 19, further comprising a cache memory for temporarily storing text information objects already received.

27. The receiver of claim 26, further comprising:

a cache updater for comparing the object ID of a currently received text information object in the signal with the object ID of each text information object stored in the cache memory, and replacing a stored text information object the object ID of which matches the one of the text information object currently received in the signal with the text information object currently received.

28. The receiver of claim 26, further comprising:

a cache displacer for comparison of the object ID of a currently received text information object in the signal with the object ID of each text information object stored in the cache memory, and storing the currently received text information object in the signal if the object ID thereof matches the object ID of none of the stored text information objects.

29. The receiver of claim 28, wherein the text information objects are arranged in a tree structure, and the controller is configured to perform the storage by overstorage of a text information object to be overstored among the ones stored in the cache memory, as it is indicated by a displacement strategy, wherein the displacement strategy defines a priority among the currently received text information object and the ones stored in the cache memory depending on their location and the location of the currently displayed text information object in the tree structure, wherein these with lower priority than the currently received text information object among the text information objects stored in the cache memory are eligible as potential text information object to be overstored.

30. The receiver of claim 26, wherein the controller is configured to at first look up the other text information object to which the currently displayed text information object refers in the cache memory using the object ID at a change of the text information to be displayed, and wait until the same is received in the signal only in case of a miss.

31. The receiver of claim 26, further comprising:

a cache hit identifier, comprising a look-up unit for looking up, for each object ID to which the currently displayed text information object refers, whether a text information object with the object ID is present in the cache memory; and a highlighter for highlighting, among the currently displayed text information, such parts associated with IDs for which a text information object is present in the cache memory, as opposed to such parts in the currently displayed text information with which IDs for which no text information object is present in the cache memory are associated.

32. The receiver of claim 19, wherein the signal is a broadcasting signal, and the means for receiving is designed to receive the broadcasting signal.

33. A method of controlling a receiver having a receiving means for receiving a signal including text information objects in which text information is contained, a display for displaying text information to be displayed, and a user selector operable by a user, wherein the text information objects in the signal are successively arranged in time, and each text information object comprises an object identification number (ID), wherein the receiver further comprises a favorite caller operable by the user, a user adder operable by the user, and a favorite memory for storage of an object ID, the method further comprising the steps of:

based on an operation of the user selector by the user, changing the text information to be displayed from currently displayed text information of a currently displayed text information object to text information of a text information object to which the current text information object refers, wherein the object ID of the current text information object differs from the object ID of the text information object to which the same refers;

based on an operation of the favorite caller by the user, changing the text information to be displayed from the currently displayed text information to text information of a text information object having the same object ID as the one stored in the favorite memory;

based on the operation of the favorite adder by the user, examining the static flag of the currently displayed text information object;

in case the static flag is not set, ignoring the operation; and in case the static flag is set, entering the object ID of the currently displayed text information object into the favorite memory.

34. A computer program with program code stored on a machine-readable medium for performing, when the computer program is executed on a computer, the method of controlling a receiver having a receiver for receiving a signal including text information objects in which text information is contained, a display for displaying text information to be displayed, and a user selector operable by a user, wherein the text information objects in the signal are successively arranged in time, and each text information object comprises an object identification number (ID), wherein the receiver further comprises a favorite caller operable by the user, a user adder operable by the user, and a favorite memory for storage of an object ID, the method further comprising the steps of:

based on an operation of the user selector by the user, changing the text information to be displayed from currently displayed text information of a currently displayed text information object to text information of a text information object to which the current text information object refers, wherein the object ID of the current text information object differs from the object ID of the text information object to which the same refers;

based on an operation of the favorite caller by the user, changing the text information to be displayed from the currently displayed text information to text information of a text information object having the same object ID as the one stored in the favorite memory;

based on the operation of the favorite adder by the user, examining the static flag of the currently displayed text information object;

in case the static flag is not set, ignoring the operation; and in case the static flag is set, entering the object ID of the currently displayed text information object into the favorite memory.

* * * * *